US009602418B2

(12) United States Patent
Kurita

(10) Patent No.: US 9,602,418 B2
(45) Date of Patent: Mar. 21, 2017

(54) APPARATUS AND METHOD FOR SELECTING A FLOW TO BE CHANGED UPON CONGESTION OCCURRENCE

(71) Applicant: FUJITSU LIMITED, Kawasaki-shi, Kanagawa (JP)

(72) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 14/606,461

(22) Filed: Jan. 27, 2015

(65) Prior Publication Data

US 2015/0281100 A1 Oct. 1, 2015

(30) Foreign Application Priority Data

Mar. 27, 2014 (JP) ................................ 2014-065392

(51) Int. Cl.
*H04L 12/825* (2013.01)
*H04L 12/801* (2013.01)
(Continued)

(52) U.S. Cl.
CPC ........ *H04L 47/263* (2013.01); *H04L 43/0882* (2013.01); *H04L 45/127* (2013.01);
(Continued)

(58) Field of Classification Search
CPC ..... H04L 47/263; H04L 47/28; H04L 47/127; H04L 43/062; H04L 43/0882; H04L 45/127; H04L 47/115
(Continued)

(56) References Cited

U.S. PATENT DOCUMENTS 6,195,680 B1 * 2/2001 Goldszmidt ............ H04L 12/56
709/203
7,136,357 B2 * 11/2006 Soumiya ................. H04L 45/00
370/236
(Continued)

FOREIGN PATENT DOCUMENTS

JP 2005-242564 9/2005
JP 2006-164038 6/2006
(Continued)

*Primary Examiner* — Edan Orgad
*Assistant Examiner* — Ivan O Latorre
(74) *Attorney, Agent, or Firm* — Staas & Halsey LLP

(57) ABSTRACT

An apparatus receives load information indicating a magnitude of a processing load, at a predetermined interval, from each transfer device in a network, and receives, from each communication device that performs communication through one or more transfer devices, a reporting packet for reporting information on a flow transmitted by the each communication device. The apparatus specifies, using the reporting packet, a first flow transferred through a first transfer device having a processing load greater than a detection threshold for detecting a congestion warning, as a candidate for a flow whose path is to be changed when congestion occurs, and transmits a first packet for shortening a transmission interval of a first reporting packet including information on the first flow, and a second packet for lengthening a transmission interval of a second reporting packet for reporting information on a flow transferred in the network without passing through the first transfer device.

7 Claims, 27 Drawing Sheets

(51) Int. Cl.
*H04L 12/721* (2013.01)
*H04L 12/841* (2013.01)
*H04L 12/26* (2006.01)

(52) U.S. Cl.
CPC .......... *H04L 47/115* (2013.01); *H04L 47/127* (2013.01); *H04L 43/062* (2013.01); *H04L 47/28* (2013.01)

(58) Field of Classification Search
USPC .................................................. 370/229–238
See application file for complete search history.

(56) References Cited

U.S. PATENT DOCUMENTS

| | | | | |
|---|---|---|---|---|
| 9,363,151 | B2* | 6/2016 | Brown | H04L 43/024 |
| 9,509,583 | B2* | 11/2016 | Phaal | H04L 43/022 |
| 2004/0003107 | A1* | 1/2004 | Barham | H04L 12/2602 |
| | | | | 709/235 |
| 2005/0108444 | A1* | 5/2005 | Flauaus | H04L 12/2602 |
| | | | | 710/15 |
| 2005/0286416 | A1* | 12/2005 | Shimonishi | H04L 1/1671 |
| | | | | 370/229 |
| 2006/0120282 | A1* | 6/2006 | Carlson | H04L 12/2602 |
| | | | | 370/229 |
| 2006/0184670 | A1* | 8/2006 | Beeson | H04L 43/026 |
| | | | | 709/224 |
| 2007/0064596 | A1* | 3/2007 | Jung | H04L 47/10 |
| | | | | 370/229 |
| 2008/0028467 | A1* | 1/2008 | Kommareddy | H04L 63/1458 |
| | | | | 726/23 |
| 2009/0059812 | A1* | 3/2009 | Chinnaswamy | H04L 43/062 |
| | | | | 370/253 |
| 2010/0214943 | A1* | 8/2010 | Immendorf | H04W 24/00 |
| | | | | 370/252 |
| 2012/0250570 | A1* | 10/2012 | Parker | H04L 43/0882 |
| | | | | 370/253 |
| 2013/0132559 | A1* | 5/2013 | Kotecha | H04L 43/0876 |
| | | | | 709/224 |
| 2014/0143300 | A1* | 5/2014 | Karlsson | H04L 67/101 |
| | | | | 709/203 |
| 2015/0063121 | A1* | 3/2015 | Nadas | H04L 45/24 |
| | | | | 370/237 |
| 2015/0163297 | A1* | 6/2015 | Kan | H04L 67/1029 |
| | | | | 709/223 |

FOREIGN PATENT DOCUMENTS

| | | |
|---|---|---|
| JP | 2011-166466 | 8/2011 |
| JP | 2013-061840 | 4/2013 |

* cited by examiner

FIG. 3

| ADDRESS | OUTPUT PORT |
|---------|-------------|
| MAC1 | Po3 |
| MAC2 | Po2 |
| MAC3 | Po2 |
| MAC4 | Po3 |
| ... | ... |

FIG. 9

| DEVICE | PORT | CONNECTION DESTINATION | LINK CAPACITY BETWEEN SWITCHES/Mbps |
|---|---|---|---|
| SW1 | Po1 | CONTROL DEVICE | — |
| | Po2 | SW2 | 160 |
| | Po3 | SW4 | 160 |
| SW2 | Po1 | SW3 | 100 |
| | Po2 | SW1 | 160 |
| | Po3 | CONTROL DEVICE | — |
| | Po4 | COMMUNICATION DEVICE 30b (MAC1, MAC4, MAC5, MAC11) | — |
| SW3 | Po1 | CONTROL DEVICE | — |
| | Po2 | SW2 | 100 |
| | Po3 | SW4 | 120 |
| SW4 | Po1 | SW3 | 120 |
| | Po2 | SW1 | 160 |
| | Po3 | CONTROL DEVICE | — |
| | Po4 | COMMUNICATION DEVICE 30a (MAC2, MAC3, MAC6, MAC12) | — |

| FLOW ID | srcMAC | dstMAC | TRANSMISSION TIMER VALUE | SAMPLE RATE |
|---|---|---|---|---|
| 1 | MAC1 | MAC2 | 2 | 1/2 |
| 3 | MAC5 | MAC6 | 10 | 1/10 |

52a:

| FLOW ID | srcMAC | dstMAC | TRANSMISSION TIMER VALUE | SAMPLE RATE |
|---|---|---|---|---|
| 2 | MAC3 | MAC4 | 30 | 1/100 |

93:

| FLOW ID | srcMAC | dstMAC | TRANSMISSION TIMER VALUE | SAMPLE RATE |
|---|---|---|---|---|
| 1 | MAC1 | MAC2 | 2 | 1/2 |
| 2 | MAC3 | MAC4 | 30 | 1/100 |
| 3 | MAC5 | MAC6 | 10 | 1/10 |

| FLOW ID | srcMAC | dstMAC | NUMBER OF PACKETS | NUMBER OF BYTES |
|---|---|---|---|---|
| 1 | MAC1 | MAC2 | 23 | 23000 |
| 3 | MAC5 | MAC6 | 3 | 4500 |

51a:

| FLOW ID | srcMAC | dstMAC | NUMBER OF PACKETS | NUMBER OF BYTES |
|---|---|---|---|---|
| 2 | MAC3 | MAC4 | 125 | 150000 |

92:

| FLOW ID | srcMAC | dstMAC | NUMBER OF PACKETS | NUMBER OF BYTES |
|---|---|---|---|---|
| 1 | MAC1 | MAC2 | 23 | 23000 |
| 2 | MAC3 | MAC4 | 125 | 150000 |
| 3 | MAC5 | MAC6 | 3 | 4500 |

FIG. 14

| FLOW ID | srcMAC | dstMAC | TRANSIT SWITCHES | | | TRANSFER RATE/Mbps | NOTIFICATION DESTINATION ADDRESS |
|---|---|---|---|---|---|---|---|
| 1 | MAC1 | MAC2 | SW4 | SW3 | SW2 | 10 | MAC11 |
| 2 | MAC3 | MAC4 | SW4 | SW3 | SW2 | 80 | MAC12 |
| 3 | MAC5 | MAC6 | SW4 | SW1 | SW2 | 20 | MAC11 |

FIG. 16

| FLOW ID | srcMAC | dstMAC | TRANSMISSION TIMER VALUE | SAMPLE RATE |
|---|---|---|---|---|
| 1 | MAC1 | MAC2 | 1.5 | 2/3 |
| 2 | MAC3 | MAC4 | 3 | 1/10 |
| 3 | MAC5 | MAC6 | 40 | 1/40 |

FIG. 18

| FLOW ID | srcMAC | dstMAC | TRANSMISSION TIMER VALUE | SAMPLE RATE |
|---|---|---|---|---|
| 1 | MAC1 | MAC2 | 1.5 | 2/3 |
| 3 | MAC5 | MAC6 | 40 | 1/40 |

52b-2

| FLOW ID | srcMAC | dstMAC | TRANSMISSION TIMER VALUE | SAMPLE RATE |
|---|---|---|---|---|
| 2 | MAC3 | MAC4 | 3 | 1/10 |

| LINK | | CAPACITY | TRANSFER RATE/ Mbps | UTILIZATION RATE/% |
|---|---|---|---|---|
| SW1 | SW2 | 160 | 20 | 12.5 |
| SW1 | SW4 | 160 | 20 | 12.5 |
| SW2 | SW3 | 100 | 90 | 90 |
| SW3 | SW4 | 120 | 90 | 75 |

FIG. 20

| FLOW ID | FLOW | | CAPACITY | TRANSFER RATE/ Mbps | UTILIZATION RATE/% |
|---|---|---|---|---|---|
| 1 | MAC1 | MAC2 | 100 | 10 | 10 |
| 2 | MAC3 | MAC4 | 100 | 80 | 80 |

FIG. 21

| FLOW ID | srcMAC | dstMAC | TRANSIT SWITCHES | | | TRANSFER RATE/Mbps | NOTIFICATION DESTINATION ADDRESS |
|---|---|---|---|---|---|---|---|
| 1 | MAC1 | MAC2 | SW4 | SW3 | SW2 | 10 | MAC11 |
| 2 | MAC3 | MAC4 | SW4 | SW1 | SW2 | 80 | MAC12 |
| 3 | MAC5 | MAC6 | SW4 | SW1 | SW2 | 20 | MAC11 |

FIG. 22

| SWITCH | ADDRESS | OUTPUT PORT |
|---|---|---|
| SW1 | MAC1 | Po3 |
| | MAC2 | Po2 |
| SW2 | MAC1 | Po1 |
| | MAC2 | Po4 |
| | MAC3 | Po4 |
| | MAC4 | Po1 |
| | MAC5 | Po2 |
| | MAC6 | Po4 |
| SW3 | MAC1 | Po3 |
| | MAC2 | Po2 |
| | MAC3 | Po2 |
| | MAC4 | Po3 |
| SW4 | MAC1 | Po4 |
| | MAC2 | Po1 |
| | MAC3 | Po1 |
| | MAC4 | Po4 |
| | MAC5 | Po4 |
| | MAC6 | Po2 |

96-1

⇒

| SWITCH | ADDRESS | OUTPUT PORT |
|---|---|---|
| SW1 | MAC1 | Po3 |
| | MAC2 | Po2 |
| | MAC4 | Po3 |
| SW2 | MAC1 | Po1 |
| | MAC2 | Po4 |
| | MAC3 | Po1 |
| | MAC4 | Po2 |
| | MAC5 | Po2 |
| | MAC6 | Po4 |
| SW3 | MAC1 | Po3 |
| | MAC2 | Po2 |
| | MAC3 | Po2 |
| SW4 | MAC1 | Po4 |
| | MAC2 | Po1 |
| | MAC3 | Po1 |
| | MAC4 | Po4 |
| | MAC5 | Po4 |
| | MAC6 | Po2 |

| | | | ENTRY INFORMATION | |
|---|---|---|---|---|
| srcMAC | dstMAC | REQUESTED ACTION | MAC ADDRESS | PORT NUMBER |
| MAC10 (CONTROL DEVICE) | MAC31 (=SW1) | 11 (=ENTRY ADDITION) | MAC4 | 3 |

F3

| | | | ENTRY INFORMATION | |
|---|---|---|---|---|
| srcMAC | dstMAC | REQUESTED ACTION | MAC ADDRESS | PORT NUMBER |
| MAC10 (CONTROL DEVICE) | MAC32 (=SW2) | 12 (=ENTRY CHANGE) | MAC4 | 2 |

F4

| | | | ENTRY INFORMATION | |
|---|---|---|---|---|
| srcMAC | dstMAC | REQUESTED ACTION | MAC ADDRESS | PORT NUMBER |
| MAC10 (CONTROL DEVICE) | MAC33 (=SW3) | 13 (=ENTRY ERASE) | MAC4 | 3 |

F5

APPARATUS AND METHOD FOR SELECTING A FLOW TO BE CHANGED UPON CONGESTION OCCURRENCE

CROSS-REFERENCE TO RELATED APPLICATION

This application is based upon and claims the benefit of priority of the prior Japanese Patent Application No. 2014-065392 filed on Mar. 27, 2014, the entire contents of which are incorporated herein by reference.

FIELD

The embodiments discussed herein relate to apparatus and method for selecting a flow to be changed upon congestion occurrence.

BACKGROUND

Networks are formed in data centers by using a plurality of servers and a plurality of switches. One or more virtual machines (VM) may operate in each of the plurality of servers. Communication between the plurality of virtual machines is relayed through the switches. A management server is included among the plurality of servers. The management server maintains topology information for the entire network and manages the communication paths in the network. The switches send information indicating their own states to the management server in predetermined cycles. The servers send information (flow information) pertaining to flows that originate from virtual machines operating therein, to the management server. The management server uses the information obtained from the switches to detect the occurrence of congestion in the network. Then, the management server uses the flow information obtained from the servers to reduce the congestion by performing a process to change the transfer path of the flow passing through the switch in which the congestion has occurred.

Japanese Patent Laid-open Publication No. 2013-61840 describes a system that includes an apparatus management device and a fault management device that analyzes the history of faults that have occurred in the system and predicts a fault that may occur in an electronic apparatus after a predetermined period of time has passed. The apparatus management device shortens an interval for obtaining information from the electronic device in which the occurrence of a fault is predicted. Japanese Patent Laid-open Publication No. 2005-242564 describes a host machine that, upon notification of an abnormal state from a printer, requests the printer having the abnormal state to transmit periodic operation information notifications at a shorter communication interval than an initial communication interval up to a prescribed time. The host machine requests printers not having an abnormal state to send operating information notifications at intervals longer than the initial communication intervals up to a prescribed time. Japanese Patent Laid-open Publication No. 2011-166466 discusses a switch that transmits a loop detecting packet having a media access control (MAC) address of the switch registered therein, and that notifies a management device when a loop detecting packet that includes the MAC address of the switch is received. Japanese Patent Laid-open Publication No. 2006-164038 discusses an analyzing device that detects transmission of packets to the same host, whose number is a prescribed value or greater, during a fixed time period, and then determines that the transmission is an attack flow.

SUMMARY

According to an aspect of the invention, an apparatus receives load information indicating a magnitude of a processing load, at a predetermined interval, from each of a plurality of transfer devices in a network, and receives, from each of a plurality of communication devices that perform communication through one or more of the plurality of transfer devices, a reporting packet for reporting information on a flow transmitted by the each communication device. The apparatus specifies, using the reporting packet, a first flow that is transferred through a first transfer device having a processing load greater than a detection threshold used for detecting a congestion warning, as a candidate for a flow whose path is to be changed when congestion occurs, and transmits a first packet for shortening a transmission interval of a first reporting packet including information on the first flow, and a second packet for lengthening a transmission interval of a second reporting packet for reporting information on a flow that is transferred in the network without passing through the first transfer device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a forwarding table, according to an embodiment;

FIG. 9 is a diagram illustrating an example of topology information, according to an embodiment;

FIG. 11 is a diagram illustrating an example of timer value tables maintained in communication devices and a control device, according to an embodiment;

FIG. 13 is a diagram illustrating examples of flow information in a communication device and a control device, according to an embodiment;

FIG. 14 is a diagram illustrating an example of flow analysis data, according to an embodiment;

FIG. 16 is a diagram illustrating an example of a timer value table after being changed, according to an embodiment;

FIG. 18 is a diagram illustrating an example of changes to a timer value table, according to an embodiment;

FIG. 19 is a diagram illustrating an example of a link utilization rate table, according to an embodiment;

FIG. 20 is diagram illustrating an example of calculation of a utilization rate for a flow that uses a link notified by a calculating unit, according to an embodiment;

FIG. 21 is a diagram illustrating an example of updated flow analysis data, according to an embodiment;

FIG. 22 is a diagram illustrating an example of an update of a forwarding information table, according to an embodiment;

FIG. 23 is a diagram illustrating examples of instruction packets, according to an embodiment;

DESCRIPTION OF EMBODIMENTS

Because the switches in the network send the states of the switches to the management server in predetermined periods, the management server is unable to detect the occurrence of congestion even if congestion occurs in the network until the information from the switches is sent after the occurrence of the congestion. Moreover, the sending of the flow information from the servers in which virtual machines are operating to the management server is also conducted at an predetermined period that is beforehand set. In order for the management server to use the flow information after the occurrence of congestion to conduct processing to avoid the congestion, the management server waits even if congestion is occurring until new flow information is sent from the respective servers without conducting the processing to avoid the congestion, such as changing the paths. Therefore, the processing to avoid the congestion is started after a further delay after the detection of the occurrence of the congestion. If the period for the management server to obtain information from the switches and servers is reduced, the time period from the occurrence of the congestion until the detection of the congestion may also be reduced, but the amount of information for the management server to conduct processing becomes excessive and the load on the management server rises which leads to a reduction in efficiency.

Even if the techniques discussed above are employed, it is difficult for the management server to obtain, at an early stage, the information for resolving the congestion. For example, even if the technique for reducing the period for reporting from a printer having an abnormal state and increasing the period for reporting from other printers is employed, if a problem does not occur in a server that is transmitting the flow causing the congestion, the transmission period for the flow information from the server is not be reduced.

Figure 1:
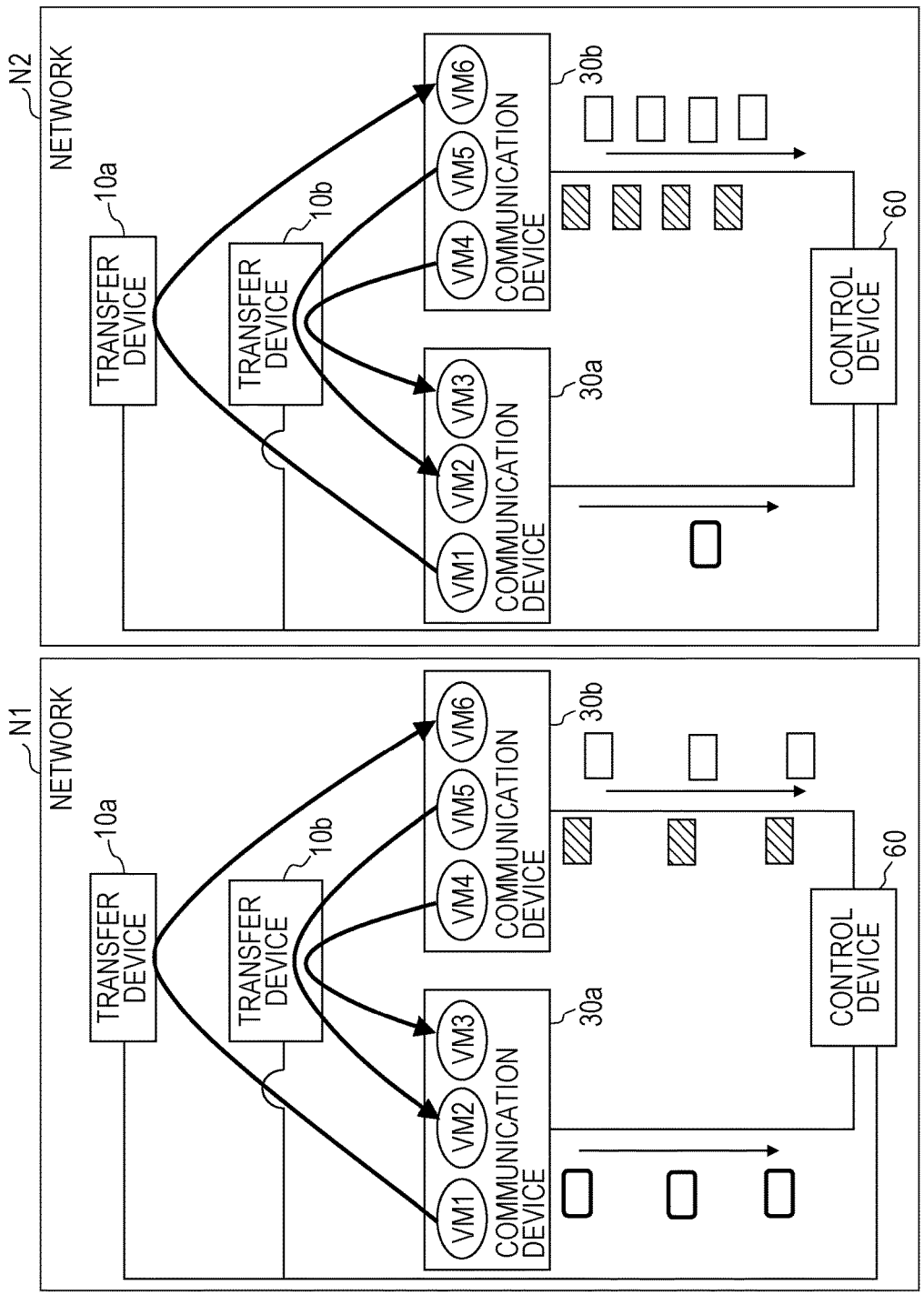
FIG. 1 is a diagram illustrating an example of a method, according to an embodiment.

FIG. 1 is a diagram illustrating an example of a method, according to an embodiment. A control device 60, communication devices 30 (30a, 30b), and transfer devices 10 (10a, 10b) are included in a network N1. The control device 60 operates as a management server and is able to determine path for flows for transmitting and receiving in the network N1. Virtual machines VM1 to VM3 operate in the communication device 30a and virtual machines VM4 to VM6 operate in the communication device 30b. In the example in FIG. 1, a flow in which data is transmitted from the VM4 to the VM3 and a flow in which data is transmitted from the VM5 to the VM2 are transferred through the transfer device 10b. The flow from the VM1 addressed to the VM6 is transferred through the transfer device 10a. FIG. 1 is merely an example, and the number of transfer devices 10 and the number of communication devices 30 in the network, and the number of virtual machines operating in the communication devices 30, may be changed as appropriate.

The control device 60 detects a congestion warning by obtaining load information that indicates a magnitude of a load applied on the transfer devices 10, at intervals of prescribed time periods, from the transfer device 10a and the transfer device 10b. Information, such as buffer utilization rates, is used as the load information. Herein, the "congestion warning" indicates a state in which a transfer rate increases to a degree in which there is a risk of congestion but congestion has not yet occurred. The control device 60 obtains information about the flows being transmitted from the communication device 30a and the communication device 30b. The communication device 30a in this case transmits information about the flow transmitted from the VM1 to the control device 60, and the communication device 30b transmits information about the flows transmitted from the VM4 and the VM5 to the control device 60. The information about the flows is a combination of transmission source addresses, destination addresses, transfer rate data, and data that may be used to calculate transfer rates. In the example of the network N1, the flow information concerning the data transmitted from the VM4 to the VM3 is indicated by the hatched squares; the flow information concerning the data transmitted from the VM5 to the VM2 is indicated by the outlined squares; and the flow information concerning the data transmitted from the VM1 to the VM6 is indicated by the rounded corner squares. In order to facilitate further explanation, it is assumed that in the initial stage, pieces of information concerning all the flows are each transmitted to the control device 60 at intervals of the same time period.

The control device 60 determines that a congestion warning is present when the utilization rate of a buffer in the transfer device 10b becomes larger than a threshold Th1. The control device 60 then uses previously stored topology information and the information obtained from the communication devices 30a and 30b to specify the flows transferred through the transfer device 10b. In the example of the network N1, the control device 60 specifies the fact that the flow transmitted from the VM4 to the VM3 and the flow transmitted from the VM5 to the VM2 are transferred through the transfer device 10b. Then the control device 60 sets a flow transferred through the transfer device 10b in which congestion may arise, as a candidate flow for which the path is to be changed when congestion occurs. Moreover, the control device 60 sends, to the communication device 30b in which the virtual machine that is the transmission source of the candidate flow is operating, a request to reduce a transmission interval for information about the specified flow. The control device 60 further lengthens the interval for reporting the flow information with regard to flows that do not pass through the transfer device 10b in which congestion may arise. In the example of the network N1, the control device 60 sends a request, to the communication device 30a, to lengthen the reporting cycle of information about the flow transmitted from the VM1.

A network N2 illustrates an example in which the transmission cycle of information concerning the flows is changed in response to the request from the control device 60. In the state illustrated with the network N2, the cycles for the communication device 30b to transmit, to the control device 60, information about the flow transmitted from the VM4 and the flow transmitted from the VM5, are reduced in comparison to the state illustrated with the network N1. The control device 60 uses the transfer rate of the flow for which the transmission cycle of the flow information is reduced and observes the fluctuation of the utilization rates in links connected to the transfer device 10b, to detect at an early stage the occurrence of congestion. The control device 60 is able to detect the occurrence of congestion in an observed link within the shortened reporting cycle of the flow information by determining the occurrence of congestion when the utilization rate of a link connected to the transfer device 10b exceeds a preset value.

Conversely, the cycle for the communication device 30a to transmit the information about the flow transmitted from the VM1 is longer in the network N2 than in the network N1. In this way, the control device 60 is able to suppress an increase in the amount of information to be processed in the control device 60 by lengthening the transmission cycle of the flow information for the flows that are not transmitted by using paths in which there is a high possibility of the occurrence of congestion.

Moreover, since an occurrence of congestion is detected by using the utilization rate of links calculated from the flow information, the control device 60 is able to perform processing to avoid congestion by using the information used in detecting the congestion. Therefore, the control device 60 is able to begin processing for reducing the congestion while detecting the congestion, in addition to detecting the occurrence of the congestion at an early stage by shortening the cycle for obtaining the information of the flow transmitted through a link in which there is a high possibility of the occurrence of congestion. As a result, the control device 60 is able to reduce the congestion by changing the path of the flow in a relatively short time period after detecting the occurrence of the congestion.

(Device Configuration)

Figure 2:
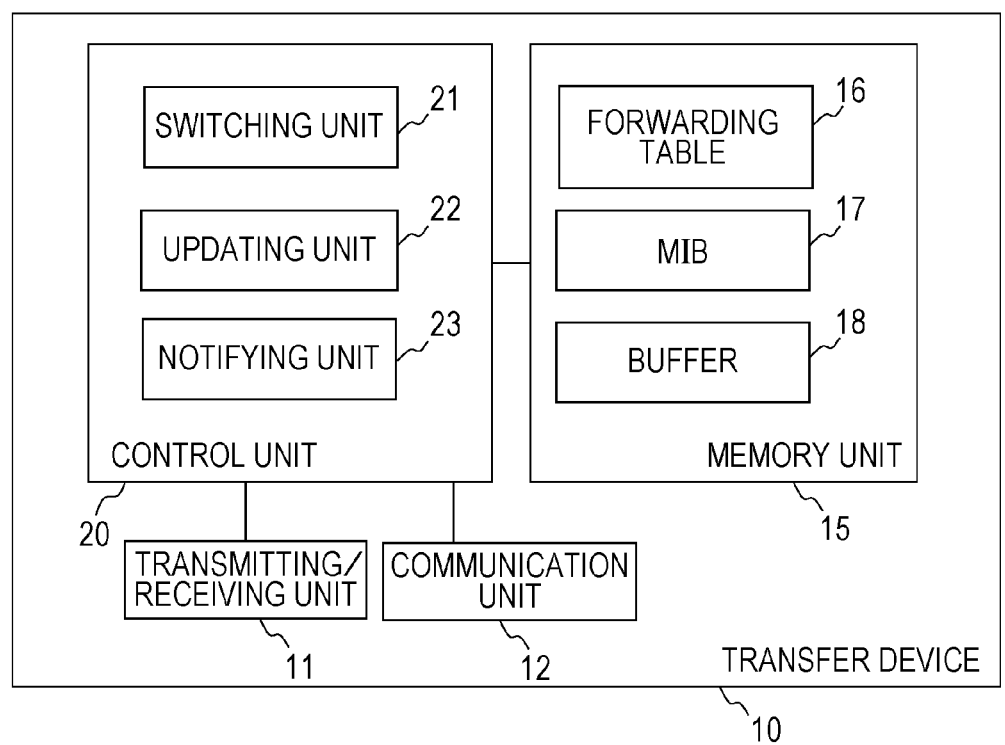
FIG. 2 is a diagram illustrating an example of a configuration of a transfer device, according to an embodiment.

FIG. 2 is a diagram illustrating an example of a configuration of a transfer device, according to an embodiment. The transfer device 10 includes a transmitting/receiving unit 11, a communication unit 12, a memory unit 15, and a control unit 20. The memory unit 15 maintains a forwarding table 16 and a management information base (MIB) 17. A buffer 18 is included in the memory unit 15. The control unit 20 includes a switching unit 21, an updating unit 22, and a notifying unit 23.

The transmitting/receiving unit 11 transmits and receives packets to and from the communication device 30 and other transfer devices in the network. The transmitting/receiving unit 11 outputs the received packets to the switching unit 21. The switching unit 21 selects output ports for the received packets by referring to the forwarding table 16.

FIG. 3 is a diagram illustrating an example of a forwarding table, according to an embodiment. The forwarding table 16 records a number identifying an output port for a packet in association with a destination address of the packet. In the example in FIG. 3, a packet addressed to MAC1 and a packet addressed to MAC4 are outputted from a port Po3, and a packet addressed to MAC2 and a packet addressed to MAC3 are outputted from a port Po2.

The switching unit 21 outputs a packet together with information about the output port to the transmitting/receiving unit 11. The transmitting/receiving unit 11 transmits the packet received from the switching unit 21 using the specified port. The buffer 18 is used for storing packets waiting to be processed by the switching unit 21.

The communication unit 12 is used for communication between the transfer devices 10 and the control device 60. Upon receiving an instruction packet from the control device 60, the communication unit 12 outputs the instruction packet to the updating unit 22. The updating unit 22 updates the forwarding table 16 by using the instruction packet. In the case, the instruction packet includes information for requesting rewriting of the forwarding table 16. An example of a format of the instruction packet and an example of processing using the instruction packets are described below. The notifying unit 23 creates notification packets for reporting the information recorded in the MIB 17 to the control device 60 at a preset cycle.

Figure 4:
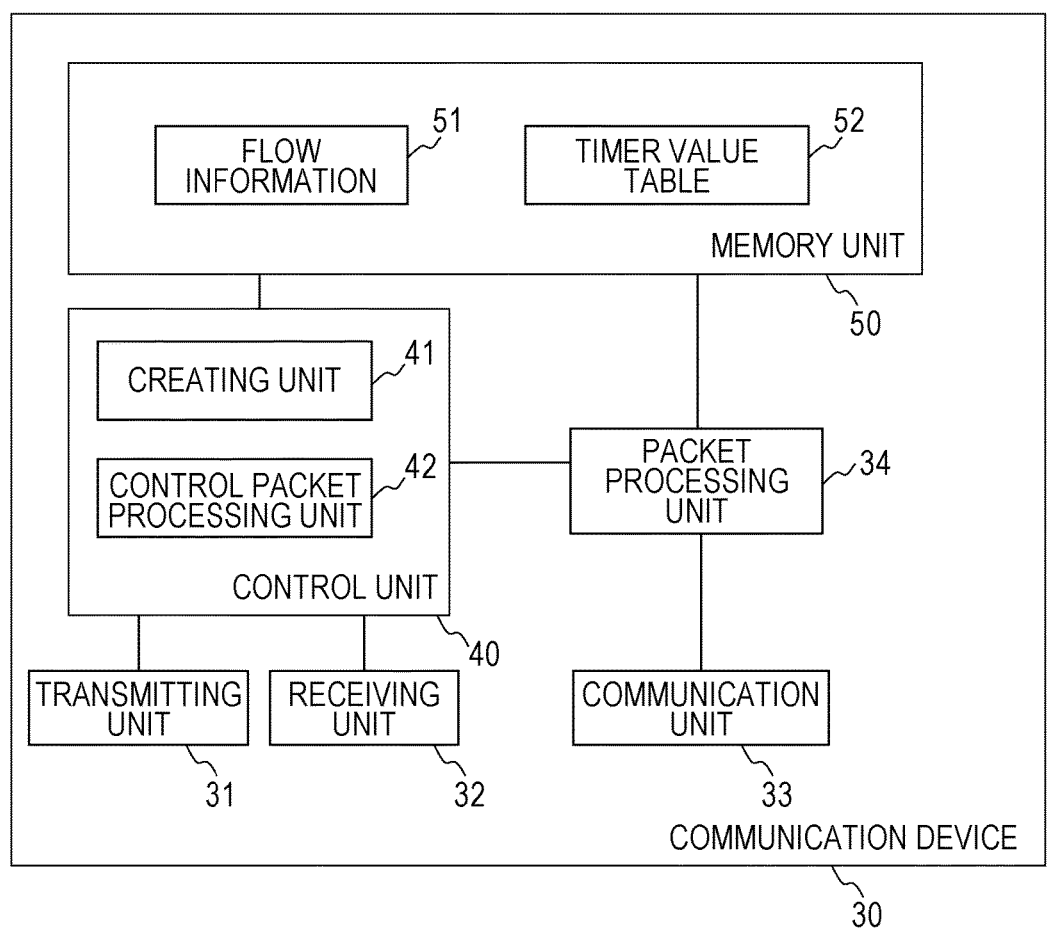
FIG. 4 is a diagram illustrating an example of a configuration of a communication device, according to an embodiment.

FIG. 4 is a diagram illustrating an example of a configuration of a communication device, according to an embodiment. The communication device 30 includes a transmitting unit 31, a receiving unit 32, a communication unit 33, a packet processing unit 34, a control unit 40, and a memory unit 50. The control unit 40 includes a creating unit 41, and a control packet processing unit 42. The memory unit 50 stores flow information 51 and a timer value table 52. Information, such as a transmission source address, a destination address, and data used in calculating a transfer rate for each flow transmitted from a virtual machine operating in the communication device 30, is recorded in the flow information 51. The timer value table 52 includes information, such as a time interval used when the communication device 30 reports the flow information to the control device 60. Examples of the flow information 51 and the timer value table 52 are described below.

The transmitting unit 31 and the receiving unit 32 are used for communication between the communication device 30 and the control device 60. The communication unit 33 is used for communication between the communication device 30 and other communication devices in the network. The packet processing unit 34 operates as any number of virtual machines and performs processing on packets that use applications. When the packet processing unit 34 operates as a plurality of virtual machines, the packet processing unit 34 also operates as a virtual switch.

The creating unit 41 creates reporting packets for reporting the information in the flow information 51 to the control device 60 in each cycle recorded in the timer value table 52. Therefore, the creating unit 41 may perform the same processing as an exporter in a flow measuring technique such as NetFlow. The control packet processing unit 42 changes the set values in the timer value table 52 by processing control packets inputted from the receiving unit 32.

Figure 5:
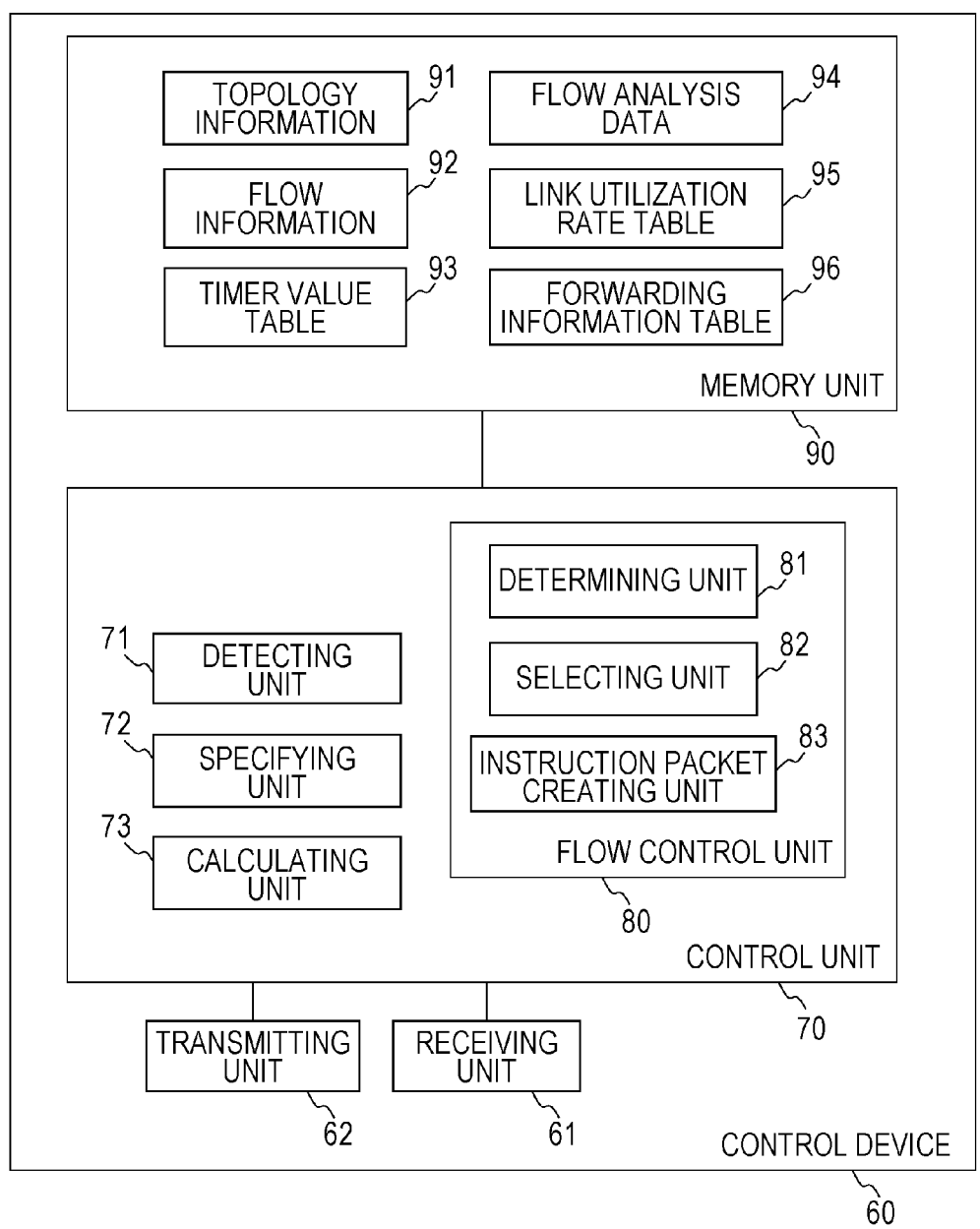
FIG. 5 is a diagram illustrating an example of a configuration of a control device, according to an embodiment.

FIG. 5 is a diagram illustrating an example of a configuration of a control device, according to an embodiment. The control device 60 includes a receiving unit 61, a transmitting unit 62, a control unit 70, and a memory unit 90. The control unit 70 includes a detecting unit 71, a specifying unit 72, a calculating unit 73, and a flow control unit 80. The flow control unit 80 includes a determining unit 81, a selecting unit 82, and an instruction packet creating unit 83. The memory unit 90 maintains topology information 91, flow information 92, a timer value table 93, flow analysis data 94, a link utilization rate table 95, and a forwarding information table 96.

The topology information 91 indicates which port is connected to which device with regard to the transfer devices 10 in the network. The flow information 92 is information about the flows transmitted and received in the network, and is created and updated by the specifying unit 72 and the calculating unit 73. The timer value table 93 indicates cycles for creating the reporting packets for reporting transfer rates of the flows being transmitted among the communication devices 30 in the network. The flow analysis data 94 indicates analysis results of the flows transmitted from the communication devices 30. The link utilization rate table 95 includes analysis results of information transmitted from the transfer devices 10 in the network. The forwarding information table 96 collects information of the forwarding table 16 used by the transfer devices 10 operating in the network. As a result, the control device 60 is able to use the topology information 91 and the forwarding information table 96 to analyze the transfer paths of flows being transferred by the transfer devices 10.

The receiving unit 61 receives packets from the transfer devices 10 and the communication devices 30. The receiving unit 61 outputs the packets received from the transfer devices 10 to the detecting unit 71 and outputs the packets received from the communication devices 30 to the specifying unit 72 and the calculating unit 73.

The detecting unit 71 uses the information transmitted from the transfer devices 10 to specify a location where a congestion warning has occurred in the network. The detecting unit 71 maintains two thresholds: the threshold Th1 and a threshold Th2. The threshold Th1 is a value used to determine whether a congestion warning exists and the threshold Th2 is a value used to detect the occurrence of congestion. For example, when the utilization rate of the buffer in the transfer device 10b exceeds the threshold Th1, the detecting unit 71 determines that a congestion warning exists in a path that passes through the transfer device 10b. When the utilization rate of the buffer in the transfer device 10b continues to increase even after exceeding the threshold Th1 and reaches the threshold Th2, the detecting unit 71 determines that congestion has occurred in the transfer device 10b. In other words, the detecting unit 71 may perform the same processing as a collector in a flow measuring technique such as NetFlow. The detecting unit 71 notifies the specifying unit 72 of the fact that the buffer utilization rate in the transfer device 10 has exceeded the threshold Th1.

The detecting unit 71 further determines that the transmission cycle of the reporting packets is able to be returned to a default state when the congestion warning in any of the transfer devices 10 has been eliminated by performing processing, such as changing the paths and the like. The detecting unit 71 notifies the determining unit 81 of the fact that the congestion warning has been eliminated when the detecting unit 71 detects that a congestion warning has been eliminated in any of the transfer devices 10.

The specifying unit 72 stores the flow information sent by the communication devices 30 in the flow information 92. Moreover, the specifying unit 72 uses the topology information 91 and the flow information 92 to specify transfer paths for the flows. The specifying unit 72 records the specified paths in the flow analysis data 94. Upon being notified, from the detecting unit 71, of the transfer devices 10 in which the buffer utilization rate exceeds the threshold Th1, the specifying unit 72 outputs information for identifying the flows that pass through the notified transfer devices 10 to the determining unit 81.

The calculating unit 73 calculates the utilization rate of each of the links using the obtained analysis results. The calculating unit 73 records the calculation results in the link utilization rate table 95. When the utilization rate of a link exceeds a predetermined value (threshold Th3), the calculating unit 73 determines to change the paths to prevent congestion in the link. The calculating unit 73 outputs information for specifying the link in which the utilization rate exceeds the threshold Th3 to the selecting unit 82.

The determining unit 81 determines the transmission cycle of the flow indicated by the specifying unit 72. The determining unit 81 creates a notifying packet for notifying the communication device 30 that is the transmission source of the flow in which the transmission cycle is changed, of the transmission cycle after the change.

When the elimination of the congestion warning has been notified from the detecting unit 71, the determining unit 81 further determines to return the creation cycle of the reporting packets to the default value for the flows in which the creation cycle of the reporting packets has been changed. The determining unit 81 is assumed to have stored beforehand the default values of the creation cycles of the reporting packets for each flow.

The selecting unit 82 calculates a value such as a predicted transfer rate or utilization rates of links for each of the flows that are transferred using the links indicated by the calculating unit 73 as having a utilization rate that exceeds the threshold Th3. The selecting unit 82 selects a flow for changing the transfer path in order to lower the utilization rate of the links indicated by the calculating unit 73. The selecting unit 82 outputs the information of the selected flows and the paths that were changed to the instruction packet creating unit 83. The instruction packet creating unit 83 creates instruction packets addressed to the transfer devices 10 to change the path of the flows instructed by the selecting unit 82. The instruction packets are control packets for requesting the destination transfer devices 10 to rewrite the forwarding table 16.

Figure 6:
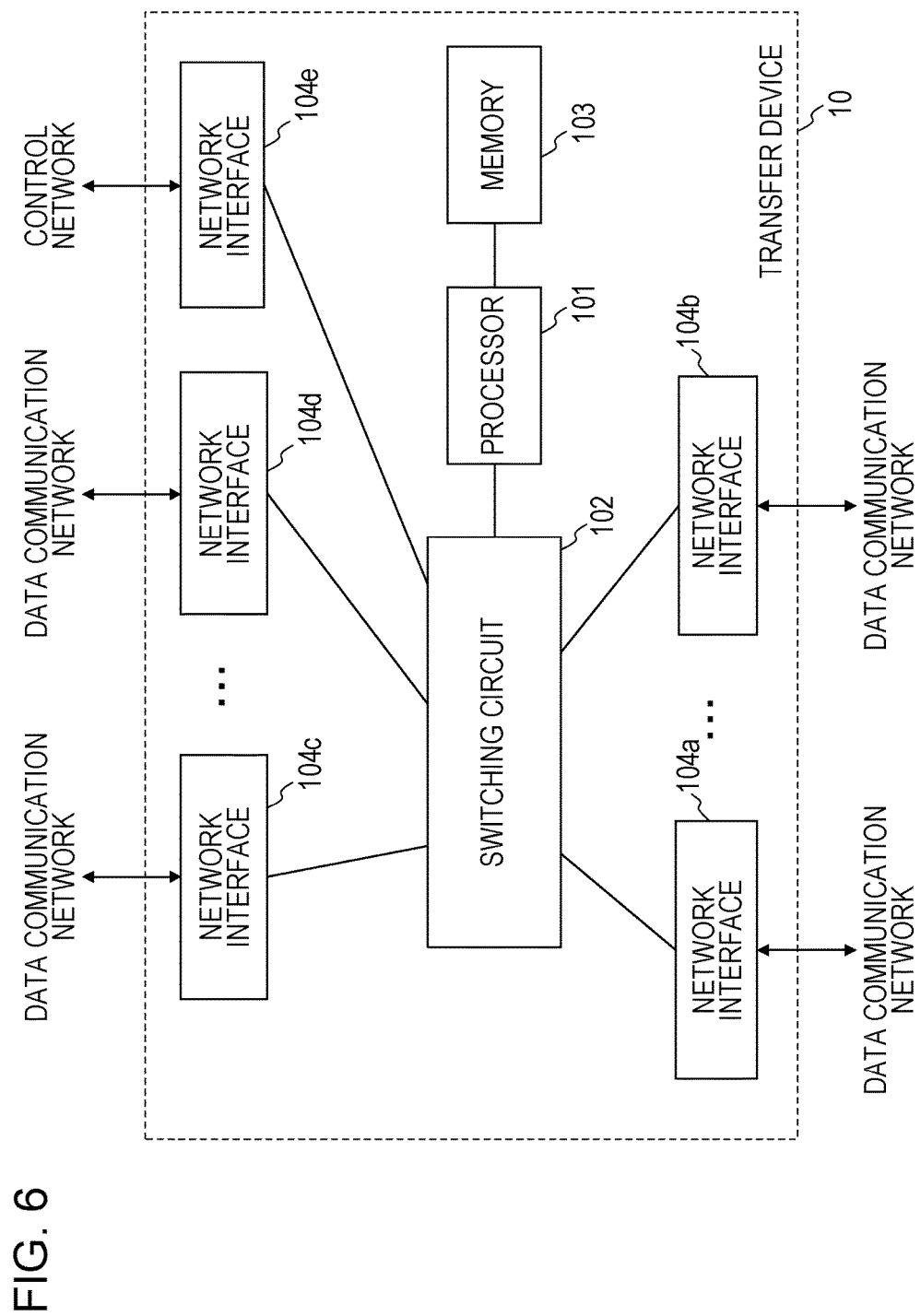
FIG. 6 is a diagram illustrating an example of a hardware configuration of a transfer device, according to an embodiment.

FIG. 6 is a diagram illustrating an example of a hardware configuration of a transfer device, according to an embodiment. The transfer device 10 includes a processor 101, a switching circuit 102, a memory 103, network interfaces 104 (104a to 104e), and a bus 105. The transfer device 10 may be configured to operate as a switch or a router. The processor 101 may be any type of processing circuit that includes a central processing unit (CPU). The processor 101 operates as the updating unit 22 and the notifying unit 23 and the memory 103 operates as the memory unit 15 in the transfer device 10. The switching unit 21 is realized by the switching circuit 102 and the processor 101. The network interfaces 104 (104a to 104d), which are connected to a network for data communication, operate as the transmitting/receiving unit 11. The network interface 104e, which is connected to a network for control, operates as the communication unit 12.

Figure 7:
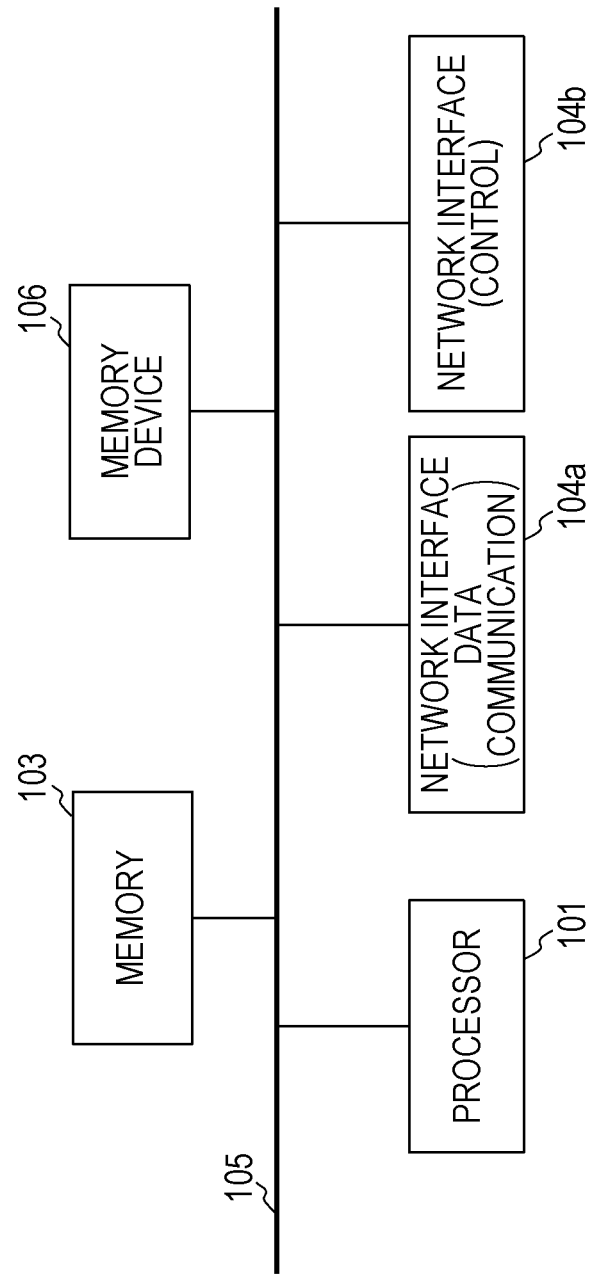
FIG. 7 is a diagram illustrating an example of a hardware configuration of a communication device and a control device, according to an embodiment.

FIG. 7 is a diagram illustrating an example of a hardware configuration of a communication device and a control device, according to an embodiment. Each of the communication device 30 and the control device 60 includes a processor 101, a memory 103, network interfaces 104, a bus 105, and a memory device 106. The communication device 30 and the control device 60 may both be realized as computers. The bus 105 connects the processor 101, the memory 103, the network interfaces 104 (104a, 104b), and the memory device 106 so as to enable the transmission and reception of data therebetween. The processor 101 may execute, for example, a program stored in the memory device 106. The memory 103 stores, as appropriate, data obtained by the operation of the processor 101 and data obtained by processing by the processor 101.

The processor 101 operates as the packet processing unit 34 and the control unit 40, and the memory 103 operates as the memory unit 50 in the communication device 30. The network interface 104a, which is connected to a network for data communication, operates as the communication unit 33 in the communication device 30. The network interface 104b is connected to the control network and operates as the transmitting unit 31 and the receiving unit 32.

The processor 101 operates as the control unit 70, and the memory 103 operates as the memory unit 90 in the control device 60. The receiving unit 61 and the transmitting unit 62 are realized by the network interface 104a connected to the control network and by the processor 101 in the control device 60. The network interface 104b is an option in the control device 60, and may not be included in the control device 60 as an option when the control device 60 does not transmit or receive user data.

(First Embodiment)

In the following description, a letter assigned to the operating communication device is appended to the reference numeral in order to facilitate distinction between the communication devices performing the processes. For example, the control packet processing unit 42a indicates the control packet processing unit 42 in the communication device 30a.

Figure 8:
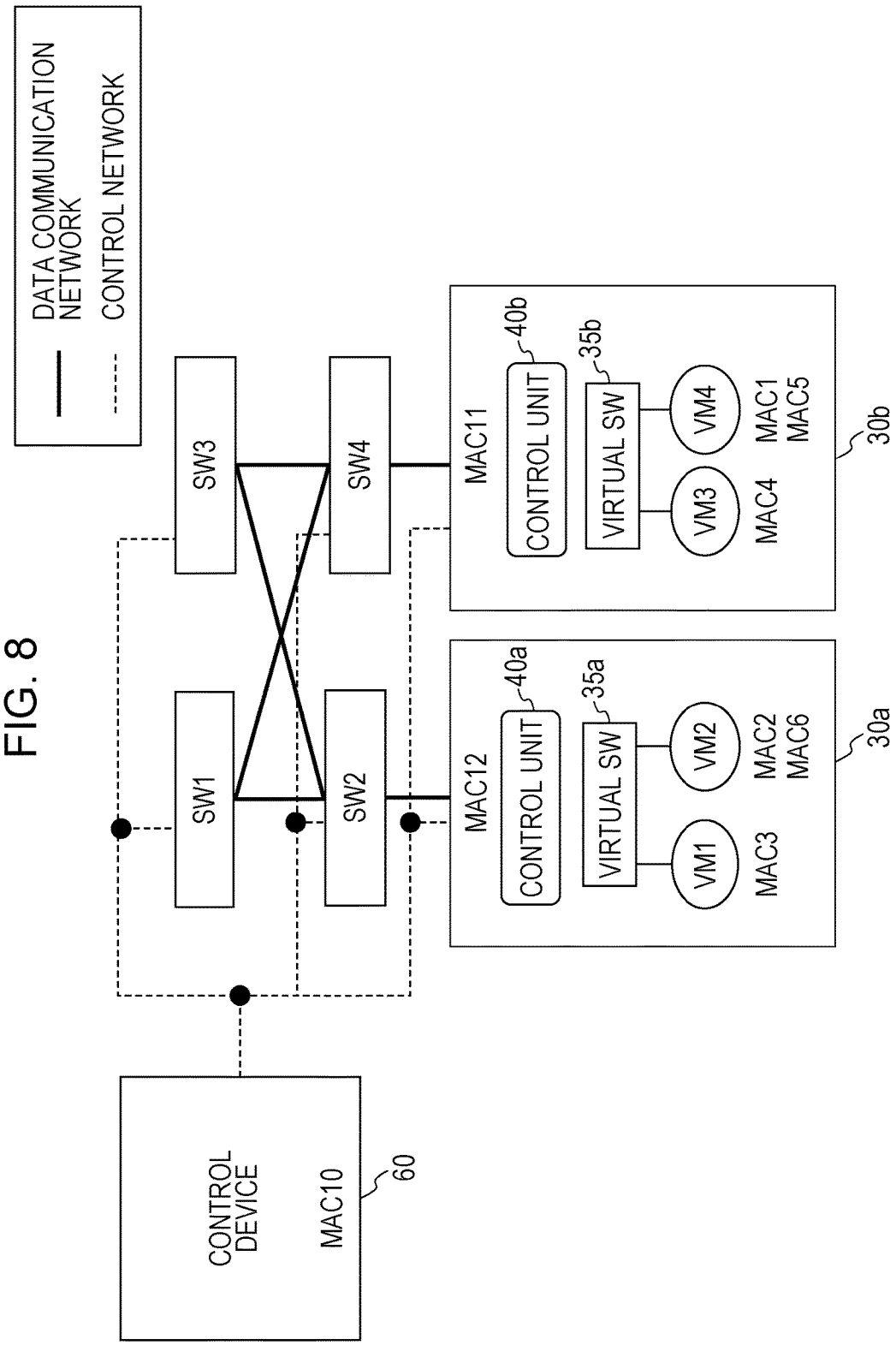
FIG. 8 is a diagram illustrating an example of a connection state in a network, according to an embodiment.

FIG. 8 is a diagram illustrating an example of a connection state in a network, according to an embodiment. Processing performed by the transfer devices 10, the communication devices 30, and the control device 60 are discussed in detail as examples of communication processing conducted in the networks illustrated in FIG. 8. The transfer devices 10 are configured as switches (SW1 to SW4) in the example in FIG. 8. The thick solid line in FIG. 8 indicates a network used for the transmission and reception of user data. The communication device 30a is connected to the switch SW2 and the communication device 30b is connected to the switch SW4 in the example in FIG. 8. Moreover, the switch SW1 is connected to the switch SW2 and the switch SW4 but is not connected to the switch SW3. Similarly, the switch SW3 is connected to the switch SW2 and the switch SW4 but is not connected to the switch SW1.

The dashed line in FIG. 8 indicates a network used for the transmission and reception of control data. The switches SW1 to SW4, the communication device 30a, and the communication device 30b are connected so that each thereof is able to perform the transmission and reception of control data with the control device 60.

The virtual machine VM1, the virtual machine VM2, and a virtual switch 35a operate in the communication device 30a. The MAC3 address is assigned to the virtual machine VM1, and two addresses MAC2 and MACE are assigned to the virtual machine VM2. The virtual machine VM3, the virtual machine VM4, and a virtual switch 35b operate in the communication device 30b. The MAC4 address is assigned to the virtual machine VM3, and two addresses MAC1 and MAC5 are assigned to the virtual machine VM4. The addresses used for the transmission and reception of control data are MAC12 for the communication device 30a, MAC11 for the communication device 30b, and MAC10 for the control device 60.

FIG. 8 merely illustrates an example of a network. Any number of the transfer devices 10 and the communication devices 30 may be included in the network in accordance with the implementation thereof. The number of the virtual machines operating in each of the communication devices 30 may change in accordance with the implementation thereof.

FIG. 9 is a diagram illustrating an example of topology information, according to an embodiment. FIG. 9 illustrates topology information 91 that is maintained in the control device 60 when the network illustrated in FIG. 8 is formed. The topology information 91 stores device identifiers, identifiers for connection destination devices for each port, and the capacities of the links between the switches, in association with each of the transfer devices 10. Moreover, the topology information 91 includes the addresses assigned to the virtual machines operating in the communication devices 30.

In the example in FIG. 9, for the switch SW1, the port Po1 is connected to the control device 60, the port Po2 is connected to the switch SW2, and the port Po3 is connected to the switch SW4. Therefore, the port Po1 in the switch SW1 is used for communication with the control network. Similarly, the port Po3 in the switch SW2, the port Po1 in the switch SW3, and the port Po3 in the switch SW4 are also used for communication with the control network. Among the ports in the switch SW2, the port Po1 is connected to the switch SW3, the port Po2 is connected to the switch SW1, and the port Po4 is connected to the communication device 30b, and these ports are used for the transmission and reception of user data. Among the ports in the switch SW3, the port Po2 is connected to the switch SW2, and the port Po3 is connected to the switch SW4. Among the ports in the switch SW4, the port Po1 is connected to the switch SW3, the port Po2 is connected to the switch SW1, and the port Po4 is connected to the communication device 30a.

The capacity of the links between the switches is the maximum value of a usable transfer rate between the switch recorded in the device column and the switches that are the connection destinations of the ports. In the example in FIG. 9, the link between the switch SW1 and the switch SW2, and the link between the switch SW1 and the switch SW4 are usable up to a transfer rate of 160 Mbps. The link between the switch SW2 and the switch SW3 is usable up to a transfer rate of 100 Mbps, and the link between the switch SW3 and the switch SW4 is usable up to a transfer rate of 120 Mbps.

The MAC1, the MAC4, the MAC5, and the MAC11 in the topology information 91 are all recorded as addresses assigned to the communication device 30b or to the virtual machines operating in the communication device 30b. Similarly, the MAC2, the MAC3, the MACE, and the MAC12 for the communication device 30a are all recorded as addresses assigned to the communication device 30a or to the virtual machines operating in the communication device 30a.

The connection relationship discussed with reference to FIG. 9 is a connection relationship among networks created using physical ports. Therefore, even if a path is changed, the link capacities or the connection relationships between the physical ports recorded in the topology information 91 does not change.

(1) Processing Conducted Before a Congestion Warning is Detected

Figure 10:
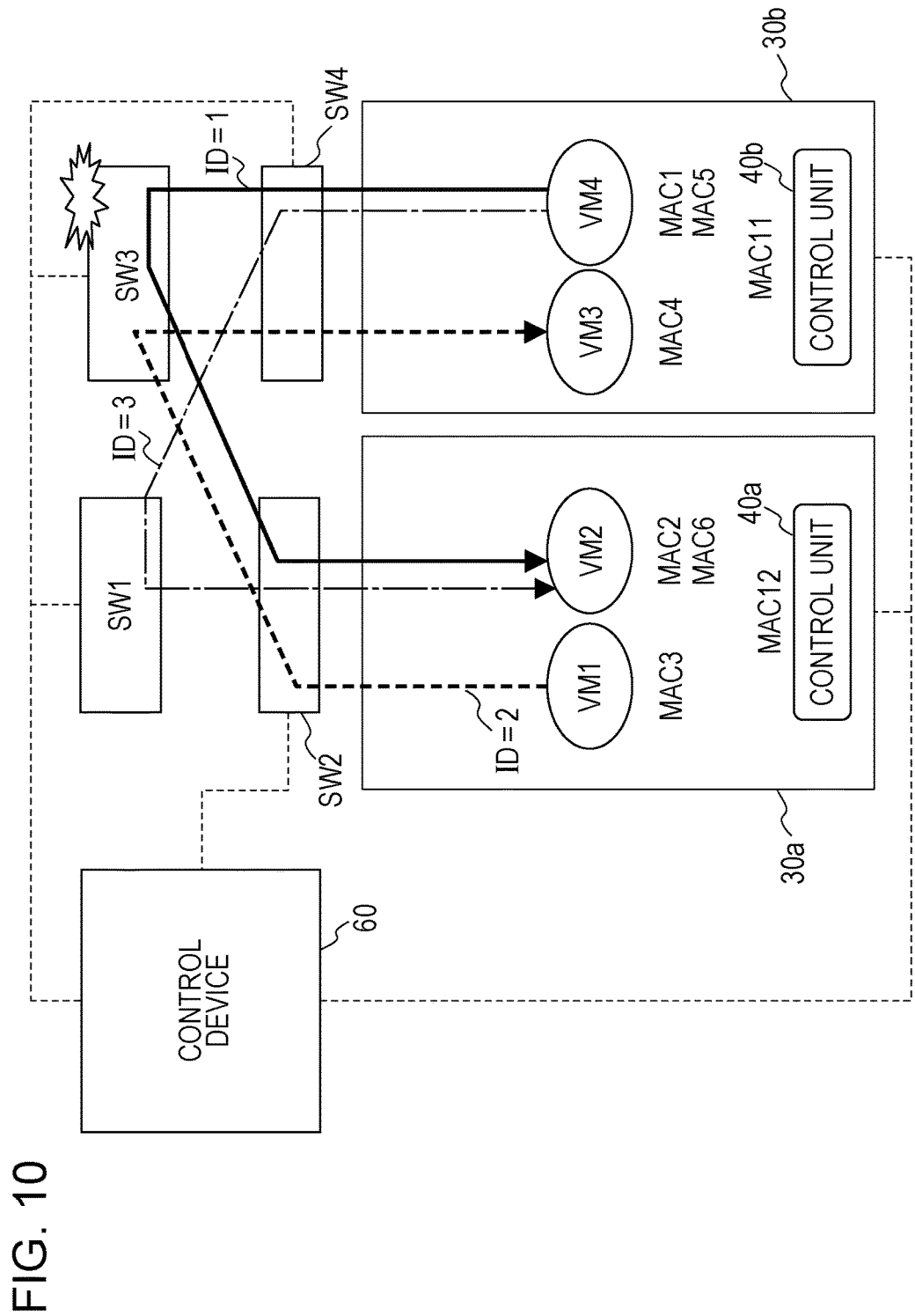
FIG. 10 is a diagram illustrating an example of transfer paths before a congestion warning is detected, according to an embodiment.

FIG. 10 is a diagram illustrating an example of transfer paths before a congestion warning is detected, according to an embodiment. An example of processing conducted before a congestion warning is detected is discussed hereinbelow with reference to FIG. 10. While the connection relationship of communication lines used for the transmission and reception of user data is not illustrated in order to facilitate understanding of the drawing in FIG. 10, the network for the transmission and reception of user data in FIG. 10 is the same as that discussed in reference to FIGS. 8 and 9. The virtual switches 35 are also omitted in FIG. 10 to facilitate understanding.

The virtual machine VM4 in the example illustrated in FIG. 10 transmits data to MAC2 of the virtual machine VM2 by using MAC1 as the transmission source address. The virtual machine VM4 transmits data to MAC6 of the virtual machine VM2 by using MAC5 as the transmission source address, and the virtual machine VM1 transmits data to MAC4 of the virtual machine VM3 by using MAC3 as the transmission source address. The data transmitted from MAC1 to MAC2 before a congestion warning is detected is transferred from the virtual machine VM4, through the switches SW4, SW3, and SW2, to the virtual machine VM2 as indicated by the thick solid line arrow. The data transmitted from MAC3 to MAC4 is transferred from the virtual machine VM1, through the switches SW2, SW3, and SW4, to the virtual machine VM3 as indicated by the thick dashed line arrow. Moreover, the data transmitted from MAC5 to MAC6 is transferred from the virtual machine VM4, through the switches SW4, SW1, and SW2, to the virtual machine VM2 as indicated by the thin chain line arrow.

A flow ID is assigned to each of the flows in order to identify each flow. In the following explanation, the flow (the thick solid line arrow) having MAC1 as the transmission source address and MAC2 as the destination address is given the flow ID "1". Similarly, the flow (the thick dashed line arrow) having MAC3 as the transmission source address and MAC4 as the destination address is given the flow ID "2", and the flow (the thin chain line arrow) having MAC5 as the transmission source address and MAC6 as the destination address is given the flow ID "3".

FIG. 11 is a diagram illustrating an example of timer value tables maintained in communication devices and a control device, according to an embodiment. Hereinbelow, it is assumed that the communication device 30b maintains the timer value table 52b in FIG. 11; the communication device 30a maintains the timer value table 52a in FIG. 11; and the control device 60 maintains the timer values set in the communication devices 30 for all of the networks in the timer value table 93.

The timer value table 52 includes a transmission source address, a destination address, a transmission timer value, and a sample rate, in association with each of the flows transmitted from the virtual machines operating in the communication devices 30 that maintain the table. For example, the transmission timer value is 2 seconds and the sample rate is 1/2 in the entry for flow ID "1" in the timer value table 52b. The transmission timer value indicates a transmission cycle for the reporting packets. The sample rate indicates the ratio of packets used for the creating unit 41 creating reporting packets to all the packets of the corresponding flow.

Figure 12:
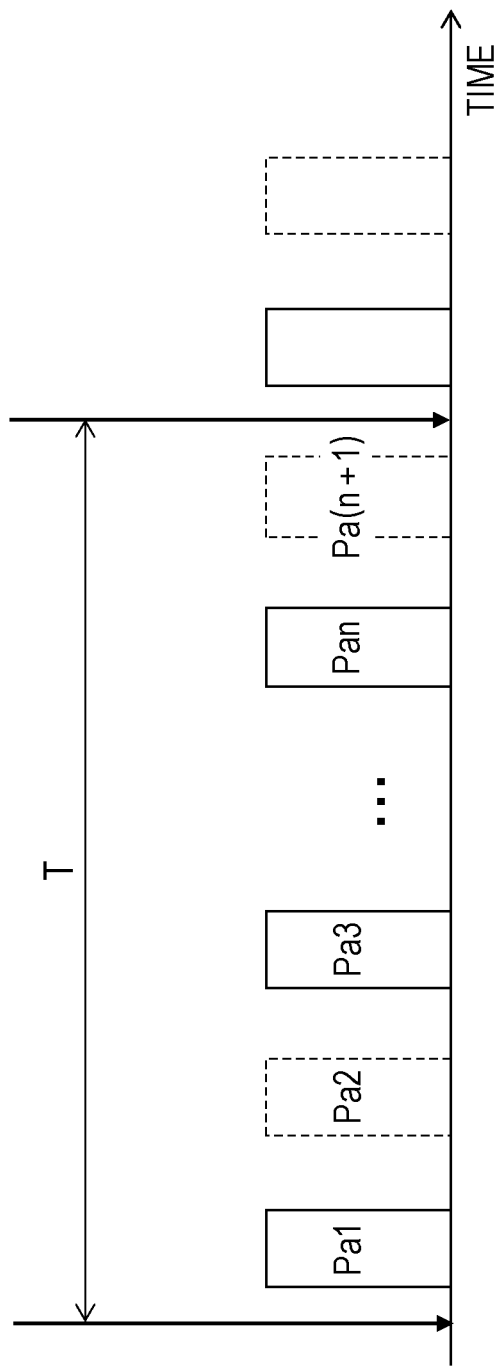
FIG. 12 is a schematic diagram illustrating an example of a method for selecting a packet as a sample, according to an embodiment.

FIG. 12 is a schematic diagram illustrating an example of a method for selecting a packet as a sample, according to an embodiment. FIG. 12 depicts a state when the creating unit 41b selects a packet as a sample for creating reporting packets for the flow with flow ID "1". As illustrated in the timer value table 52b in FIG. 11, the sample rate for the flow with flow ID "1" is 1/2. As a result, the creating unit 41b selects a packet in the flow ID "1" created by the packet processing unit 34b, as a sample, at a ratio of one packet to two packets. In the example in FIG. 12, the creating unit 41b selects a packet Pa1 as a sample but does not selects a packet Pa2, which is transmitted subsequent to the packet Pa1, as a sample. Similarly for the packets Pa3 and thereafter, the creating unit 41b selects every other packet in the flow with flow ID "1" as a sample. The creating unit 41b calculates the total number of packets selected as samples and calculates an integrated value of the data amount transmitted with the sample packets, and records the result in association with the flow ID. According to this processing, the creating unit 41b creates flow information for notifying the information about the flow with flow ID "1" to the control device 60 at a cycle of once every two seconds in the communication device 30b storing the timer value table 52b illustrated in FIG. 11. In order for the control device 60 to be able to properly calculate the transfer rate, the integrated value calculated by the creating unit 41 is calculated by taking the sum of lengths of the header and the payload of the packet as the length of the data transmitted in one packet.

The other flows whose timer values are recorded in the timer value tables 52a and 52b exemplified in FIG. 11 are also processed in the similar manner. For example, because the transmission timer value is set at 10 seconds for the flow with flow ID "3", the creating unit 41b creates flow information 51 for notifying the control device 60 about the information on the flow with flow ID "3" at a cycle of once every 10 seconds. At this time, because the sample rate for the flow with flow ID "3" is 1/10, the creating unit 41b samples one packet for every ten packets and creates the flow information 51 for the flow with flow ID "3". The creating unit 41a in the communication device 30a also creates reporting packets according to the transmission timer values in the timer value table 52a. As a result, the creating unit 41a updates the flow information 51 for reporting the information about the transfer rates of the flow with flow ID "2" at a frequency of once every 30 seconds, and at this time calculates the number of packets by sampling one packet for 100 packets.

FIG. 13 is a diagram illustrating examples of flow information in a communication device and a control device, according to an embodiment. FIG. 13 illustrates flow information for two communication devices 30 and a control device 60. The flow information 51 is information that stores the number of packets and the amount of data, which have been transmitted in one transmission cycle by the processing of the creating unit 41, in association with a combination of a flow ID, and the transmission source and destination addresses of the flow. The flow information 51b is an example of information that has been created for the flows with flow IDS "1" and "3" by the creating unit 41b in the communication device 30b. The flow information 51a is an example of information about the flow with flow ID "2" that has been created by the creating unit 41a in the communication device 30a.

The creating unit 41 updates the information stored in the entries of the flow information 51 and creates transmission packets for transmitting the information included in the updated entries to the control device 60. For example, the creating unit 41b updates the entry of the flow with flow ID "1" in the flow information 51b once every two seconds and creates a reporting packet storing the contents of the updated entries in the payload, which is addressed to the control device 60. At this time, the creating unit 41b sets the address (MAC11) assigned to the control unit 40 to the address of the transmission source of the reporting packets. Therefore, when the flow information 51b is created as illustrated in FIG. 13, a reporting packet including the following information elements is created:

Transmission source address: MAC11
Destination address: MAC10
Flow ID: 1
Flow transmission source address: MAC1
Flow destination address: MAC2
Number of extracted packets: 23
Data amount transmitted in extracted packets: 23000 bytes The creating unit 41b conducts similar processing for the flow with flow ID "3". Therefore, the fact indicating that three packets have been extracted from the packets of the flow with flow ID "3" from MAC5 to MACE and 4500 bytes of data have been sampled is written in the reporting packet addressed to the control device 60. The creating unit 41b transmits the reporting packet to the control device 60 through the transmitting unit 31b.

When the creating unit 41a updates the flow information about the flow with flow ID "2" in the communication device 30a, the creating unit 41a also creates a reporting packet addressed to the control device 60. When the flow information 51a is updated as illustrated in FIG. 13, the creating unit 41a creates a reporting packet indicating that 150000 bytes have been included in 125 packets in the flow with flow ID "2" from MAC3 to MAC4. At this time, the creating unit 41a sets the address (MAC12) assigned to the control unit 40a to the address of the transmission source of the reporting packet. The creating unit 41a transmits the reporting packet to the control device 60 through the transmitting unit 31a.

Next, processing conducted by the control device 60 upon receiving a reporting packet will be explained. The receiving unit 61 outputs packets received from the communication device 30b or the communication device 30a to the specifying unit 72 and the calculating unit 73. The receiving unit 61 stores the addresses to be used during communication over the control network between the communication devices 30 and the control device 60, and determines the output destination based on the addresses of the received packets.

The specifying unit 72 stores the information of the payloads in the reporting packets received from the communication devices 30 in the flow information 92. FIG. 13 illustrates the flow information 92 when a reporting packet for reporting the information in the flow information 51b in FIG. 13 is transmitted from the communication device 30b and when a reporting packet for reporting the information in the flow information 51a in FIG. 13 is transmitted from the communication device 30a. The calculating unit 73 uses the information stored in the flow information 92 and the timer value table 93 (FIG. 11) to calculate the transfer rates of the flows. The calculating unit 73 uses the following formula to calculate the transfer rate (bps):

$$R=(B\times 8)\times(1/P)\times(1/T)$$

In the formula, R represents the transfer rate (bps), B represents the number of bytes of the data accumulated at the transmission cycle for the flow subject to the calculation of the transfer rate, P represents a sample rate for the flow subject to the calculation, and T represents the transmission cycle for the reporting packets related to the flow subject to the calculation. The calculating unit 73 reads out the number of bytes for the flow subject to the calculation from the flow information 92, and reads out the sample rate and the transmission cycle from the timer value table 93.

The specifying unit 72 uses the topology information 91 and the forwarding information table 96 to determine a transfer path for each flow and specifies a switch through which the flow passes. Moreover, the specifying unit 72 obtains the transmission source address of the reporting packet as a destination to which the control information for the flow is to be notified.

FIG. 14 is a diagram illustrating an example of flow analysis data, according to an embodiment. The flow analysis data 94 stores a transfer rate, information on a transfer path, and a notification destination of the control information, in association with each of the flows. In this case, the transfer rates in the flow analysis data 94 are values calculated by the calculating unit 73 using the flow information 92 and the timer value table 93. The information on a transfer path for each flow represents the order of the switches which the transfer path passes through, and obtained as a result of analysis by the specifying unit 72 using the topology information 91 and the forwarding information table 96. It is assumed that the information on the transfer paths illustrated in FIG. 14 indicates paths explained with reference to FIG. 10.

(2) Processing by the Control Device 60 when Detecting a Congestion Warning

Next, an example of operations performed by the switches and the detection of a warning will be explained.

The transmitting/receiving unit 11 in each of the switches outputs the received packets to the switching unit 21. The switching unit 21 uses the forwarding table 16 to specify the output ports and outputs the specified information along with the packets to the transmitting/receiving unit 11. The transmitting/receiving unit 11 transmits the packets from the specified ports. The notifying unit 23 updates the MIB 17 information, in accordance with the processing of the switching unit 21 and the storage state of the packets in the buffer 18. The notifying unit 23 further creates a packet for notifying the control device 60 about information that indicates the magnitude of the processing load, at a predetermined cycle. The information in the MIB 17 of each switch may be used as the information that indicates the magnitude of the processing load. Hereinbelow, a case in which the amount of data accumulated in the switch is used as a value to indicate the magnitude of the processing load will be explained. The notifying unit 23 transmits the created packet to the control device 60 through the communication unit 12.

The receiving unit 61 receives the packets including the values indicating the processing loads from the switches and then outputs the received packets to the detecting unit 71. The receiving unit 61 beforehand stores therein addresses to be used when the switches communicate using the control network, and determines the output destination of the received packet based on the transmission source address of the received packet.

Figure 15:
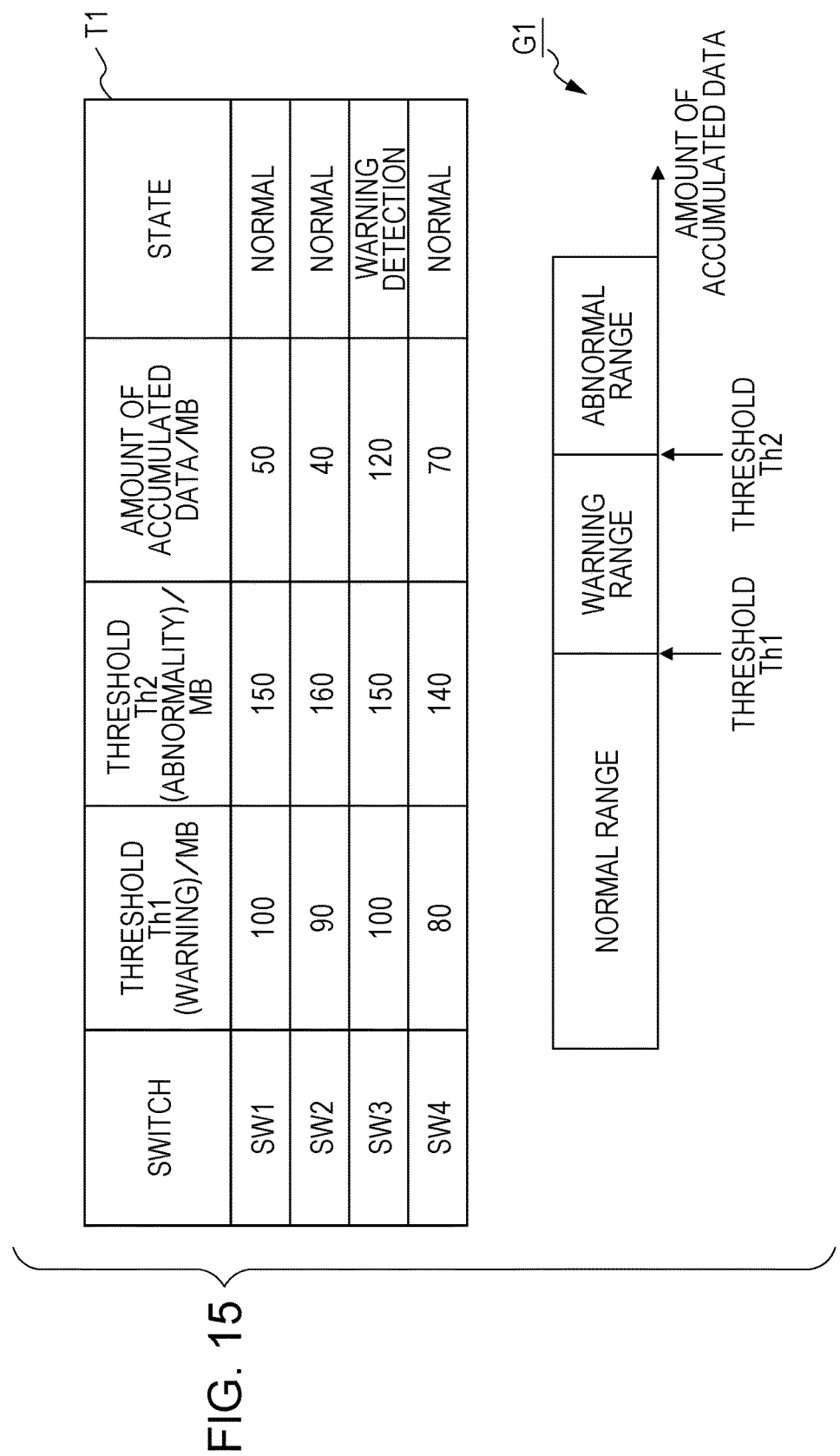
FIG. 15 is a diagram illustrating an example of detecting a congestion warning, according to an embodiment.

FIG. 15 is a diagram illustrating an example of detecting a congestion warning, according to an embodiment. The graph G1 in FIG. 15 illustrates an example of a relationship between thresholds and the states of a switch. In the example in graph G1, the threshold Th1 is a maximum value of a data amount that may be accumulated in the buffer 18 of the switch when it is determined that the possibility of the occurrence of congestion in a link connected to that switch is a level ignorable. As a result, an operating state of the switch having a data amount accumulated in the buffer 18 that is less than the threshold Th1 is determined to be normal. The threshold Th2 is a minimum value of a prospective data amount accumulated in the buffer 18 of the switch in a state in which there is a high probability of the occurrence of congestion in a link connected to that switch. Therefore, it is determined that the congestion has occurred in the switch or in one or more links connected to the switch when the data amount stored in the buffer 18 of that switch exceeds the threshold Th2. The switch in which the data amount in the buffer 18 falls between the threshold Th1 and the threshold Th2 is considered as a switch in which a congestion warning is occurring. The values of the thresholds Th1 and Th2 are set for each switch in accordance with the size of the buffer 18 provided in the switch and with the processing performance of the switch.

The determination processing using the relationship between the thresholds indicated in the graph G1 and the data amount in the buffer 18 is performed by the detecting unit 71 in the control device 60. The detecting unit 71 maintains, for each switch, the thresholds for comparison with the amount of data accumulated in the buffer 18 of the each switch. In the example illustrated in FIG. 15, the threshold Th1 is 100 MB and the threshold Th2 is 150 MB for the switch SW1 as illustrated in the table T1. Therefore, while the detecting unit 71 determines that the switch SW1 is operating normally before the data amount accumulated in the buffer 18 of the switch SW1 reaches 100 MB, the detecting unit 71 determines that a congestion warning has occurred when the accumulated data is between 100 MB and 150 MB. The operating states are determined using the thresholds Th1 and Th2 in the same way in the other switches.

The table T1 in FIG. 15 indicates an example of determination results for each switch. The table T1 in FIG. 15 illustrates an example in which the data amount accumulated in the buffer 18 is 50 MB for the switch SW1, 40 MB for the switch SW2, 120 MB for the switch SW3, and 70 MB for the switch SW4. The detecting unit 71 determines that the switch SW1 is operating normally because the data amount accumulated in the switch SW1 is less than the threshold Th1 (100 MB) for the switch SW1. The detecting unit 71 determines that the switches SW2 and SW4 are performing transfer processing normally because the accumulated data amount in the switch SW2 is less than the threshold Th1 for the switch SW2 and the accumulated data amount in the switch SW4 is less than the threshold Th1 for the switch SW4. The data amount accumulated in the buffer 18 of the switch SW3 is 120 MB; however, the threshold Th1 is 100 MB and the threshold Th2 is 150 MB for the switch SW3. As a result, the detecting unit 71 determines that a congestion warning has occurred for the switch SW3. The detecting unit 71 notifies the specifying unit 72 about the fact that the congestion warning has been detected for the switch SW3.

The specifying unit 72 specifies the flow transferred through the switch notified by the detecting unit 71 as a flow for which the transmission cycle of the reporting packet is to be shortened. Because the occurrence of the congestion warning in the switch SW3 is notified by the detecting unit 71, the specifying unit 72 obtains the flow ID of the flow that is transferred through the switch SW3 from the flow analysis data 94. As illustrated in FIG. 14, flows with flow IDs "1" and "2" are transferred through the switch SW3. The specifying unit 72 then notifies the determining unit 81 of the fact that the flows with flow IDs "1" and "2" are transferred through the switch SW3.

The determining unit 81 shortens the transmission cycle for the flows with flow IDS "1" and "2" and also shortens the sample rate so that the rate of fluctuation of the transmission cycle and the rate of fluctuation of the interval between sampled packets becomes the same. Specifically, the determining unit 81 changes the sample rate to the product of a reciprocal of the ratio of the transmission cycle after the change to the original transmission cycle and the sampling rate being used currently. According to this processing, even if the transmission cycle is changed from a first cycle to a second cycle, the number of packets extracted in the first cycle would be the same as the number of packets extracted in the second cycle. The determining unit 81 stores the timer value and sample rate corresponding to the newly determined transmission cycle, in the timer value table 93.

FIG. 16 is a diagram illustrating an example of a timer value table after being changed, according to an embodiment. In the flow with flow ID "1", the transmission timer value before the change (FIG. 11) is 2 seconds, whereas the transmission timer value is shortened to 1.5 seconds after the change (FIG. 16), and thus the transmission cycle of the reporting packet is reduced to 3/4. Meanwhile, the determining unit 81 changes the sample rate to 2/3 which is 4/3 times the value before the change (1/2) because the transmission timer value is 3/4 times the previous value. The transmission timer value and the sample rate for the flow with flow ID "2" is also changed using the same method. In the example in FIG. 16, the determining unit 81 shortens the transmission timer value for the flow with flow ID "2" from 30 seconds to 3 seconds. The determining unit 81 also multiplies the sample rate for the flow with flow ID "2" by 10 because the transmission timer value was reduced to 1/10. As a result, the sample rate for the flow with flow ID "2" is changed to 1/10.

Moreover, the determining unit 81 lengthens the transmission cycle of the reporting packets for the flows not transferred through the switch in which the congestion warning is detected, in order to suppress an increase in the load on the control device 60. The determining unit 81 also refers to the flow analysis data 94 when specifying flows that are not transferred through the switch in which the congestion warning is detected. In this case, the flow with flow ID "3" is not transferred through the switch SW3. Accordingly, the determining unit 81 lengthens the transmission timer value used for creating the reporting packets of the flow with flow ID "3". In the example in FIG. 16, the determining unit 81 changes the transmission timer value for the flow with flow ID "3" to 40 seconds which is four times the value set in FIG. 11. The determining unit 81 also multiplies the sample rate for the flow with flow ID "3" by 1/4 when changing the transmission timer value. As a result, the sample rate for the flow with flow ID "3" is changed to 1/40 in FIG. 16.

Figure 17:
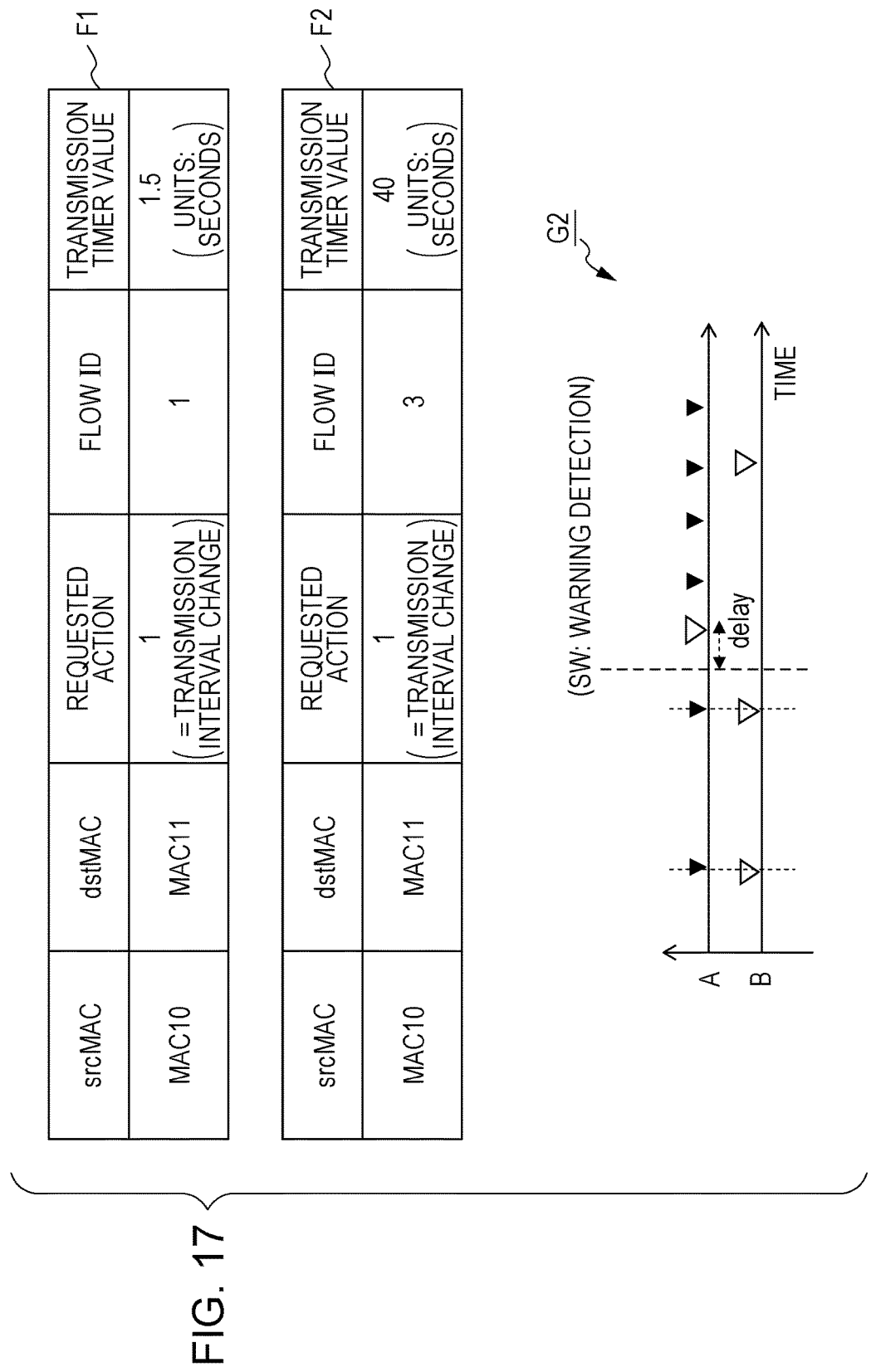
FIG. 17 is a diagram illustrating an example of packets used for changing timing for transmitting flow information and an example of changing flow information transmission timing, according to an embodiment.

FIG. 17 is a diagram illustrating an example of packets used for changing timing for transmitting flow information and an example of changing flow information transmission timing, according to an embodiment. The determining unit 81 creates notifying packets for notifying the communication devices 30 about the transmission timer values and the sample rates stored in the timer value table 93 after the changes. F1 in FIG. 17 illustrates an example of a format of a notifying packet created by the determining unit 81 when the transmission timer value is changed to a smaller value. The notifying packet includes a transmission source address, a destination address, requested action, a flow ID, and a transmission timer value. The transmission source address in the notifying packet is the address (MAC10) set by the control device 60. The notification destination address in the flow analysis data 94 is set as the destination address. Since F1 represents data for setting a timer value for the flow with flow ID "1", the destination address is set at MAC11 based on the flow analysis data 94 (FIG. 14). The value in the requested action field is a value for indicating the change of the transmission timer value, and "1" is set in F1 of FIG. 17. As a transmission timer value, the value newly set in the timer value table 93 is stored. A notifying packet is created in the same way for the flow with flow ID "2". As a result, the following information elements are included in the packet used to change the transmission timer value for the flow with flow ID "2":

Flow transmission source address: MAC10
Destination address: MAC12
Requested action: 1
Flow ID: 2
Transmission timer value: 3

The format of the notifying packet used when increasing a transmission timer value is the same as F1. For example, a packet including the information elements illustrated in F2 is created when the transmission timer value for the flow with flow ID "3" is changed from 10 seconds to 40 seconds. The destination address is also set at MAC11 since the flow with flow ID "3" is also transmitted from the communication device 30b.

The graph G2 in FIG. 17 is a schematic view for explaining an example of a change in the receiving frequency of the reporting packets caused by the change in the transmission timer values. "A" illustrates an example of a transmission frequency of reporting packets of the flow transferred through the switch in which the warning is detected, such as the flows with flow IDs "1" and "2". As illustrated in "A", the control device 60 reduces the transmission timer values for the flows transferred through the switch in which the warning is detected and thus the time period from the detection of the warning till the new reporting packets are obtained may be made shorter than the transmission interval of the reporting packets before the detection of the warning. Conversely, for the flows that are not transferred through the switch in which the warning is detected, the control device 60 is able to lengthen the time period from the detection of the warning until the new reporting packets are obtained to be greater than the transmission interval of the reporting packets before the detection of the warning as illustrated in "B".

(3) Processing to Update the Transmission Timer Values by the Communication Devices 30

Hereinbelow an example of processing performed by the communication devices 30 upon receiving notifying packets from the control device 60 will be explained. The receiving unit 32 outputs the received packets to the control packet processing unit 42. The control packet processing unit 42 changes information on the entries in the timer value table 52 concerning the flow for which the change of the transmission timer value has been requested in the notifying packets.

FIG. 18 is a diagram illustrating an example of changes to a timer value table, according to an embodiment. The timer value table 52b-2 represents the timer value table 52 after the updating performed by the processing of the control packet processing unit 42b. The control packet processing unit 42b receives the notifying packet illustrated in F1 in FIG. 17 and then sets the transmission timer value for the flow with flow ID "1" at the value notified in the notifying packet. Furthermore, the control packet processing unit 42b obtains a ratio of the value after the change to the current setting value, and sets the product of the reciprocal of the obtained ratio and the value of the current sample rate as a new sample rate. That is, the control packet processing unit 42b, based on the notifying packet illustrated in F1 in FIG. 17, reduces the transmission timer value to 1.5 seconds. Moreover, since the transmission timer value before the change is 2 seconds, the control packet processing unit 42b calculates the ratio of the value after the change to the current setting value to be a value of 3/4. Since the sample rate before the change of the flow with flow ID "1" is 1/2, the control packet processing unit 42b sets the new sample rate at 2/3, which is 4/3 times the sample rate before the change.

Upon obtaining the notifying packet F2 illustrated in FIG. 17, the control packet processing unit 42b also increases the transmission timer value for the flow with flow ID "3" to 40 seconds. Because the transmission timer value is 40 seconds which is 4 times the value set in FIG. 11, the determining unit 81 sets the sample rate at 1/40 which is 1/4 times the current setting for the flow with flow ID "3".

The control packet processing unit 42a performs processing on the notifying packets for the communication device 30a in the same way. The control packet processing unit 42a reduces the transmission timer value for the flow with flow ID "2" from 30 seconds to 3 seconds, and changes the sample rate from 1/100 to 1/10. As a result, the timer value table 52a-2 illustrated in FIG. 18 is obtained.

When the updating of the timer value table 52 is complete, the creating unit 41 updates the flow information 51 and creates reporting packets in accordance with the transmission timer value after the updates. As a result, after the updates of the timer value table 52b-2 in the communication device 30b are finished, the creating unit 41b transmits the reporting packets concerning the flow with flow ID "1", once every 1.5 seconds, through the transmitting unit 31b to the control device 60. The creating unit 41b further creates reporting packets concerning the flow with flow ID "3", once every 40 seconds, and transmits the reporting packets to the control device 60. Meanwhile, the creating unit 41a in the communication device 30a creates reporting packets concerning the flow with flow ID "2", once every 3 seconds, and transmits the reporting packets to the control device 60.

(4) Changing a Path when Congestion Occurs

Upon receiving the reporting packets from the communication devices 30 in the network after the changes to the transmission timer values, the control device 60 performs an analysis in the same way as before the detecting the congestion warning. As a result, the data of the flow analysis data 94 is updated.

FIG. 19 is a diagram illustrating an example of a link utilization rate table, according to an embodiment. FIG. 19 illustrates a link utilization rate table 95. After the detection of the warning, the calculating unit 73 specifies a utilization rate for each link, based on the flow analysis data 94. Processing of the calculating unit 73 updating the data in the link utilization rate table 95 will be explained hereinbelow.

The calculating unit 73 obtains the connection relationships between the switches and the capacities of the links between the switches from the topology information 91 (FIG. 9). The values for the fields of the links and the fields of the capacities in the link utilization rate table 95 are specified as a result of this processing.

Next, for each link that interconnects the switches in the network, the calculating unit 73 specifies flows that pass through the each link in order to obtain a total sum of transfer rates of data being transferred through the each link. The following explanation uses the example of the flow analysis data 94 as illustrated in FIG. 14, which is updated based on the reporting packets that are received by the control device 60 after the detection of the warning and the updates of the transmission timer values. In the case, since the flow with flow ID "1" is transferred through the switches SW4, SW3, and SW2, the calculating unit 73 determines that the flow with flow ID "1" passes through a link between the switches SW4 and SW3 and a link between the switches SW3 and SW2. Since the flow with flow ID "2" is transferred through the switches SW4, SW3, and SW2, the calculating unit 73 also determines that the flow with flow ID "2" passes through a link between the switches SW4 and SW3 and a link between the switches SW3 and SW2. Further, since the flow with flow ID "3" is transferred through the switches SW4, SW1, and SW2, the calculating unit 73 determines that the flow with flow ID "3" passes through a link between the switches SW4 and SW1 and a link between the switches SW1 and SW2.

The calculating unit 73 next specifies, for each of links, flows that are being used in transfer processing of the each link, and calculates a total sum of the transfer rates of the flows being transferred via the each link. The link between the switches SW1 and SW2 and the link between the switches SW1 and SW4 are both used for transferring the flow with flow ID "3". The link between the switches SW2 and SW3 and the link between the switches SW3 and SW4 are both used for transferring the two flows with flow IDs "1" and "3". The transfer rates of the flows are described below based on FIG. 14:

Flow ID "1": 10 Mbps
Flow ID "2": 80 Mbps
Flow ID "3": 20 Mbps

As a result, the transfer rates of the link between the switches SW1 and SW2 and the link between the switches SW1 and SW4 are each 20 Mbps as illustrated in the field for the transfer rates in FIG. 19. Meanwhile, the transfer rates of the link between the switches SW2 and SW3 and the link between the switches SW3 and SW4 are each 90 Mbps.

The calculating unit 73 sets, for each of links, a percentage of the transfer rate with regard to the capacity of the each link as a link utilization rate for the each link. For example, the utilization rate of the link between the switches SW1 and SW2 is 12.5% since the transfer rate is 20 Mbps while the capacity is 160 Mbps. The calculating unit 73 conducts the same calculations for the other links. In the example illustrated in FIG. 19, the utilization rate of the link between the switches SW1 and SW4 is calculated as 12.5%, the utilization rate of the link between the switches SW2 and SW3 is calculated as 90%, and the utilization rate of the link between the switches SW3 and SW4 is calculated as 75%.

The calculating unit 73 notifies the selecting unit 82 about the link in which the link utilization rate exceeds the threshold Th3 as a link whose transfer rate is to be lowered to reduce congestion. In this case, the threshold Th3 is a predicted value of a utilization rate of a link connected to a switch in which the processing load approaches the threshold Th2 for detecting congestion. That is, the threshold Th3 is a predicted value of the utilization rate of a link connected to a switch whose utilization rate of the buffer 18 is about to reach the threshold Th2, and is set based on an experimental rule. For example, it is assumed that the threshold Th3 is set at a value equal to 85% of the link utilization rate. In this case, when the transmission of flows from the switch SW3 toward the switch SW2 is performed in a state in which the utilization rate of the link between the switch SW3 and the switch SW2 exceeds 85%, the utilization rate of the buffer 18 in the switch SW3 rises to a point near the threshold Th2. In FIG. 19, since the utilization rate of the link between the switches SW2 and SW3 is 90%, the calculating unit 73 notifies the selecting unit 82 about the link between the switches SW2 and SW3 as a link whose transfer rate is to be lowered.

FIG. 20 is diagram illustrating an example of a calculation of a utilization rate of a flow that uses a link notified by a calculating unit, according to an embodiment. A method for the selecting unit 82 to calculate a link utilization rate for each flow using the link notified by the calculating unit 73 will be explained with reference to FIG. 20.

The selecting unit 82 specifies a flow passing through the notified link by searching the flow analysis data 94 (FIG. 14), using the link notified from the calculating unit 73 as a key. Because the link between the switches SW2 and SW3 is notified in this case, the selecting unit 82 obtains flow IDs of the flows that pass through both the switches SW2 and SW3 from the flow analysis data 94. Moreover, the selecting unit 82 reads the transfer rates associated with the obtained flow IDs from the flow analysis data 94. According to this processing, flows that pass through the link between the switches SW2 and SW3 are specified as flows with flow IDs "2" and "3", the transfer rate of the flow with flow ID "1" is specified as 10 Mbps, and the transfer rate of the flow with flow ID "2" is specified as 80 Mbps. In other words, with this processing, the selecting unit 82 obtains the values in the fields of the flow ID and the transfer rate in FIG. 20. While a combination of the transmission source address and destination address is included as the flow information in FIG. 20 to facilitate understanding, the transmission source address and destination address may or may not be obtained by the selecting unit 82.

The selecting unit 82 further uses the topology information 91 (FIG. 9) to obtain the capacity of the link notified by the calculating unit 73. The capacity of the link between the switches SW2 and SW3 in this case is 100 Mbps. The selecting unit 82 calculates, for a transfer rate of each flow, a percentage of the transfer rate with regard to the capacity of the each link. As a result, the utilization rate of the link between the switches SW2 and SW3 for the flow with flow ID "1" is 10% as illustrated in FIG. 20. Based on the same calculation, the utilization rate of the flow with flow ID "2" is 80%. The selecting unit 82 selects a flow having a relatively high utilization rate as a flow whose transfer path is to be changed, from among the flows whose link utilization rates have been calculated. In the example in FIG. 20, the selecting unit 82 selects the flow with flow ID "2" as a flow whose transfer path is to be changed.

Next, the selecting unit 82 searches for a transfer path that does not pass through the link whose link utilization rate exceeds the threshold Th3, with respect to each of the selected flows. For example, the selecting unit 82 searches for a path not passing through the link between the switches SW2 and SW3, with respect to the flow with flow ID "2". That is, the selecting unit 82 searches for a path that originates from the communication device 30a in which the virtual machine VM1 assigned the MAC3 is operating, and reaches the communication device 30b in which the virtual machine assigned the MAC4 is operating, without passing through the link between the switches SW2 and SW3. The selecting unit 82 refers as appropriate to the topology information 91 during the searching. As a result of the search, the selecting unit 82 specifies a path that passes from the communication device 30a through the switch SW2, the switch SW1, and the switch SW4, through which the flow with flow ID "2" is able to be transferred without passing through the link between the switches SW2 and SW3. The selecting unit 82 uses the specified path to update the flow analysis data 94.

FIG. 21 is a diagram illustrating an example of updated flow analysis data, according to an embodiment. FIG. 21 indicates that the path for the flow with flow ID "2" passes through the switch SW2, the switch SW1, and the switch SW4. As a result, the information outlined with the thick line among the information in FIG. 21 differs from the information in FIG. 14. The selecting unit 82 writes information on the newly selected path in the flow analysis data 94, and notifies the instruction packet creating unit 83 that the path for the flow with flow ID "2" is to be changed.

FIG. 22 is a diagram illustrating an example of an update of a forwarding information table, according to an embodiment. An example of processing conducted by the instruction packet creating unit 83 will be explained with reference to FIG. 22 as an example of a case in which the forwarding information table 96-1 is changed to the forwarding information table 96-2.

The forwarding information table 96-1 is a table that has been obtained by collecting information on forwarding table 16 used by the switches before the change of the path. That is, the forwarding information table 96-1 indicates, for each address specified as a destination in each switch, a port used for outputting a packet having the each address. For example, the packet addressed to MAC4 is currently outputted from the port Po1 of the switch SW2. The port Po1 of the switch SW2 is connected to the switch SW3 as indicated in the topology information (FIG. 9). As a result, the packet (flow ID "2") addressed to MAC4 is transferred from the switch SW2 to the switch SW3 by the switch SW2 outputting the packet addressed to MAC 4 from the port Po1. The packet addressed to MAC4 is outputted from the port Po3 of the switch SW3. The port Po3 of the switch SW3 is connected to the switch SW4 (see FIG. 9). As a result, the packet (flow ID "2") addressed to MAC4 is transferred from the switch SW3 to the switch SW4 by the switch SW3 outputting the packet addressed to MAC 4 from the port Po3.

First, the instruction packet creating unit 83 specifies a switch in which the transfer destination is changed due to the change of the path in order to change the path of the flow with flow ID "2" as indicated in the flow analysis data 94 after the change. A path before the change for the flow ID "2" is switch SW2 to switch SW3 to switch SW4, whereas a path after the change is switch SW2 to switch SW1 to switch SW4. Accordingly, the instruction packet creating unit 83 specifies the fact that the transfer destination for the packet addressed to MAC4 in the switch SW2 is changed from SW3 to SW1 due to the change of the path. The instruction packet creating unit 83 further specifies the fact that the transfer of the packet addressed to MAC4 in the switch SW1 is newly started, and the fact that the transfer of the packet addressed to MAC4 in the switch SW3 is stopped. As a result, the instruction packet creating unit 83 determines that the forwarding table 16 is to be changed for each of the switches SW1, SW2, and S3.

Next, the instruction packet creating unit 83 uses the forwarding information table 96-1 and the topology information 91 (FIG. 9) to determine the information of the output ports to be set for the new transfer path. For example, since the port Po2 of the switch SW2 is connected to the switch SW1, the instruction packet creating unit 83 determines that the output port for the packet addressed to MAC4 in the switch SW2 is the port Po2. Similarly, since the port Po3 of the switch SW1 is connected to the switch SW4, the instruction packet creating unit 83 determines that the output port for the packet addressed to MAC4 in the switch SW1 is the port Po3. The instruction packet creating unit 83 then erases the information of the output port addressed to MAC4 in the switch SW3 from the forwarding table 16 for the switch SW3. The instruction packet creating unit 83 creates instruction packets for notifying the switches about the determined information.

FIG. 23 is a diagram illustrating examples of instruction packets, according to an embodiment. The instruction packet includes a transmission source address, a destination address, a requested action for the switch, and entry information. The instruction packet creating unit 83 records the address (MAC10) assigned to the control device 60 in the transmission source address field. The instruction packet creating unit 83 records the addresses assigned to the switch that is the destination of the instruction packet in the destination address field. A value that indicates one of adding a new entry in the forwarding table 16, changing the content of current entry, and erasing an entry is recorded in the requested action field. In the example in FIG. 23, the value for adding a new entry is "11", the value for changing the content of a current entry is "12", and the value for erasing an entry is "13". Information on the entry subject to the action instructed in the requested action field is recorded in the entry information field. The information on the entry is represented by a combination of a MAC address and an output destination port number that are included in the entry.

The instruction packet is transmitted to a first switch in which the congestion warning is detected and to a second switch that begins transfer of the flow subject to the change of the transfer path in place of the first switch in which the congestion warning is detected. Moreover, the instruction packets are also transmitted to switches which are transferring the flow subject to the change of the transfer path to the first switch in which the congestion warning is detected.

F3 in FIG. 23 represents a packet for instructing the switch SW1 to write information for outputting the packet addressed to MAC4 from the port Po3 in the forwarding table 16. In the example in FIG. 23, the address of the switch SW1 is MAC31, the address of the switch SW2 is MAC32, and the address of the switch SW3 is MAC33. Similarly, F4 in FIG. 23 represents an instruction packet for instructing the switch SW2 to rewrite the forwarding table 16 so that the output destination of the packet addressed to MAC4 is changed to the port Po2. Moreover, F5 in FIG. 23 represents an instruction packet for instructing the switch SW3 to erase from the forwarding table 16 the entry that specifies the port Po3 as the output destination of the packet addressed to MAC4. The instruction packet creating unit 83 outputs the instruction packets to the transmitting unit 62 when the packets represented by F3 to F5 are created. The transmitting unit 62 transmits the instruction packets to the destination switches via the control network.

As illustrated in FIG. 22, the instruction packet creating unit 83 conducts processing to update the forwarding information table 96-1 to the forwarding information table 96-2. The forwarding information table 96-2 collects information on the forwarding tables 16 held in the switches when the forwarding tables 16 are rewritten according to the instruction packets. When addition of a new entry is performed in the switch SW1 according to F3 in FIG. 23, information indicating that the output destination of a packet addressed to MAC4 is the port Po3 is stored in the forwarding table 16 of the switch SW1. When the change of an entry is performed in the switch SW2 according to F4 in FIG. 23, the output destination of a packet addressed to MAC4 is changed to the port Po2 in the forwarding table 16 of the switch SW2. When the change of an entry is performed in the switch SW3 according to F5 in FIG. 23, the data of the transfer destination of a packet addressed to MAC4 is erased in the forwarding table 16 of the switch SW3. The changed parts in the forwarding tables 16 are indicated by the thick lines in FIG. 22.

Next, operations of the switches upon receiving the instruction packets will be explained. Upon receiving an instruction packet from the control device 60, the communication unit 12 in the switch SW1 outputs the instruction packet to the updating unit 22. The updating unit 22 rewrites the forwarding table 16 by performing the action instructed in the requested action field, using the information stored in the entry information field of the instruction packet. Since the instruction packet illustrated in F3 in FIG. 23 is received in the case of the switch SW1, the updating unit 22 writes the information for outputting the packet addressed to MAC 4 from the port Po3, in the forwarding table 16. As a result, the forwarding table 16 in the switch SW1 matches the information associated with the switch SW1 in the forwarding information table 96-2 in FIG. 22.

Similarly, in the switches SW2 and SW3, the processing instructed in the requested action fields of the instruction packets is performed by using the information stored in the entry information fields of the instruction packets. That is, the updating unit 22 in the switch SW2 changes the output port of the packet addressed to MAC4 from the Po1 to the Po2. As a result, the forwarding table 16 in the switch SW2 matches the information associated with the switch SW2 in the forwarding information table 96-2 in FIG. 22. The updating unit 22 in the switch SW3 erases the information of the output port for the packet addressed to MAC4 from the forwarding table 16. As a result, the forwarding table 16 in the switch SW3 matches the information associated with the switch SW3 in the forwarding information table 96-2 in FIG. 22.

Figure 24:
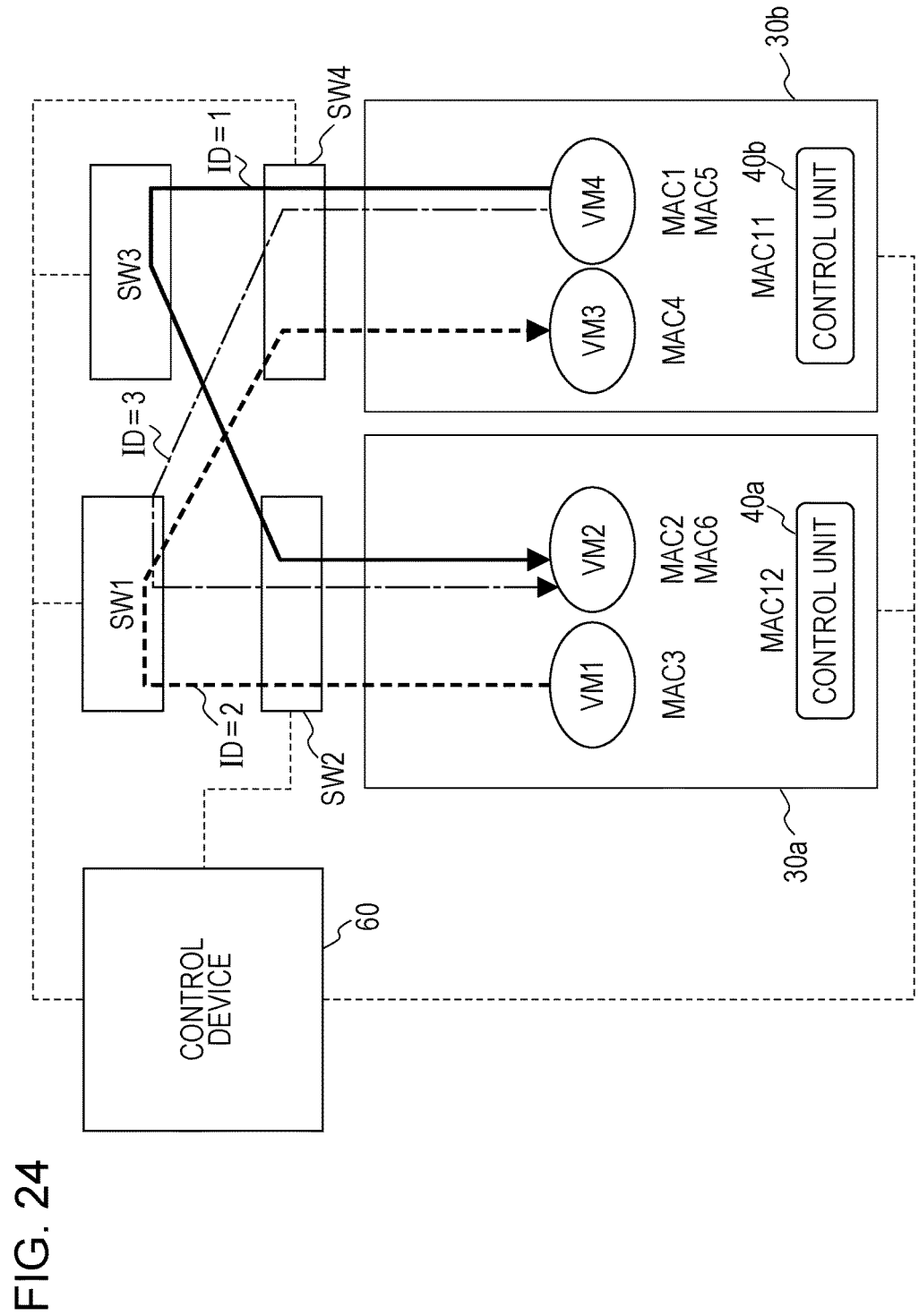
FIG. 24 is a diagram illustrating an example of changing a path, according to an embodiment.

FIG. 24 is a diagram illustrating an example of changing a path, according to an embodiment. When the forwarding tables 16 in the switches SW1 to SW4 is rewritten, the flow with flow ID "2" (thick dashed line arrow) is transferred through the switches SW2, SW1, and SW4 as illustrated in FIG. 24. The link between the switches SW2 and SW3 is used only for transferring the flow with flow ID "1" because the transfer paths of the flows with flow IDs "1" and "3" are not changed. As a result, the transfer rate of the link between the switches SW2 and SW3 is reduced to the transfer rate of the flow with flow ID "1" (10 Mbps) whereby the congestion in the link between the switches SW2 and SW3 is reduced. The amount of data stored in the buffer 18 in the switch SW3 is also reduced in connection with the elimination of the congestion in the link between the switches SW2 and SW3.

Communication between the control device 60 and the communication devices 30 following the detection of the congestion warning has been explained in detail. Meanwhile, the switches SW1 to SW4 notify the control device 60 about the data amounts accumulated in the buffers 18 at a predetermined cycle even after the detection of the congestion warning. The detecting unit 71, based on the packets notified by the switches, determines whether the utilization amounts of the buffers 18 in all of the switches fall below the threshold Th1. When the utilization amounts of the buffers 18 in all of the switches fall below the threshold Th1, the detecting unit 71 determines that all of the switches are operating normally. As a result, the detecting unit 71 requests the determining unit 81 to return the transmission cycles of the reporting packets for all of the flows to the default values. The determining unit 81 beforehand stores therein the default values of the transmission cycles for each flow. Accordingly, the determining unit 81 transmits, for each of flows, a notifying packet in which the transmission timer value have been returned to the default transmission cycle, through the transmitting unit 62 to a communication device 30 that is the transmission source of the each flow. The creating unit 41 in the communication device 30 obtains the notifying packet from the control device 60 through the receiving unit 32. The creating units 41 update, in accordance with the notifying packet, the timer value table 52 in the same way as when the congestion warning was detected. As a result, when all of the switches return to normal operating states, the transmission cycle of the reporting packet for each of the flows are returned to the default cycle.

Figure 25:
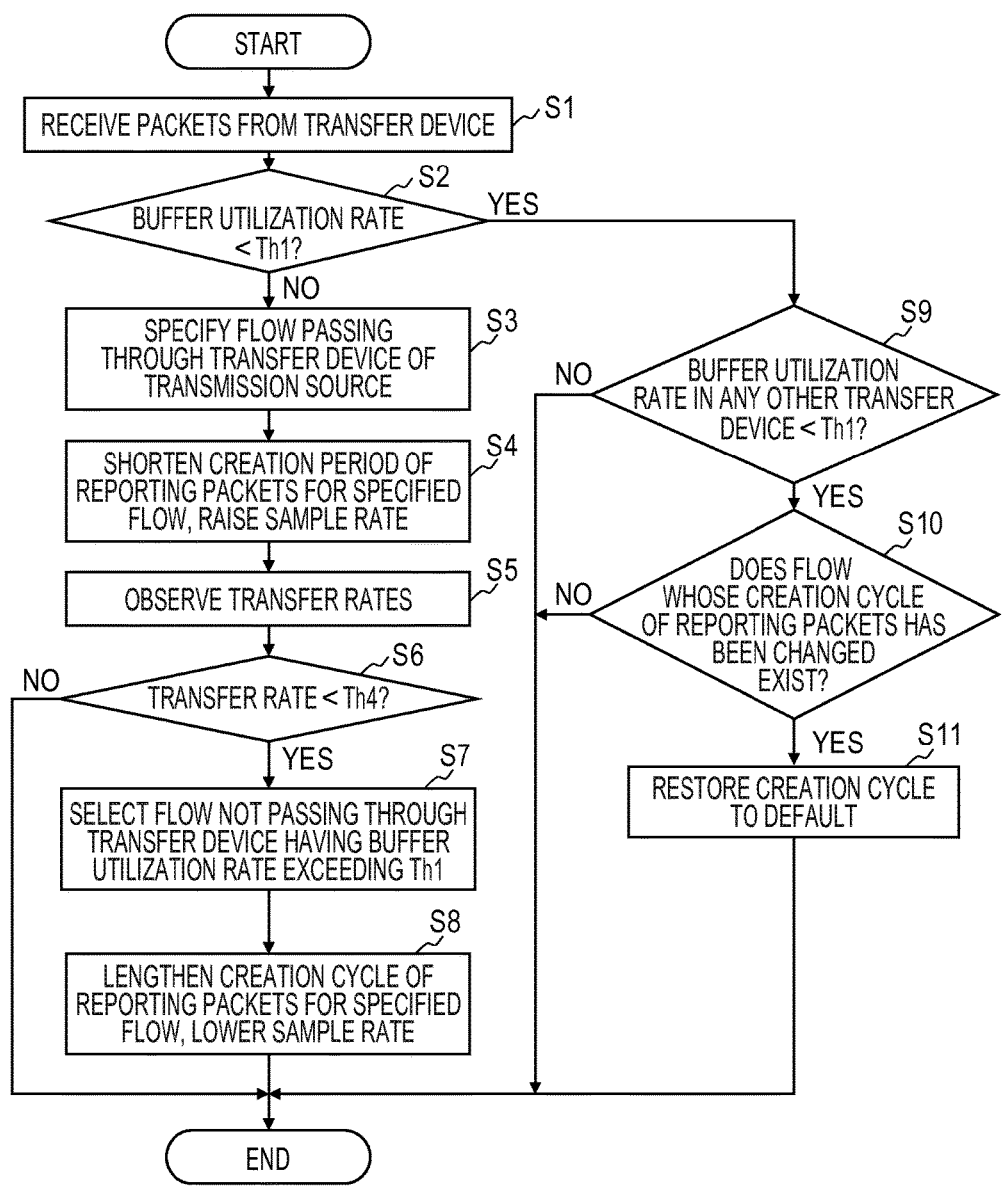
FIG. 25 is a diagram illustrating an example of an operational flow chart for processing that is performed by a control device when a packet is received from a transfer device, according to an embodiment.

FIG. 25 is a diagram illustrating an example of an operational flow chart for processing that is performed by a control device when a packet is received from a transfer device, according to an embodiment. FIG. 25 illustrates an example of a case where a transmission timer value for reporting packets is formed so as not to increase until the transfer rate of the control packets received by the control device 60 reaches a prescribed value (threshold Th4).

The receiving unit 61 outputs a packet received from the transfer device 10 to the detecting unit 71 (step S1). The detecting unit 71 determines whether the utilization rate of the buffer 18 in the transfer device 10 of the transmission source is less than the threshold Th1 (step S2). When the utilization rate of the buffer 18 in the transfer device 10 of the transmission source is equal to or greater than the threshold Th1 (step S2: No), the detecting unit 71 notifies the specifying unit 72 that a congestion warning is detected, and the specifying unit 72 specifies a flow that passes through the transfer device 10 of the transmission source (step S3). The determining unit 81 reduces the value (creation cycle of reporting packets) of the transmission timer to be used when creating the reporting packets and raises the sample rate for the flow specified by the specifying unit 72 (step S4). The detecting unit 71 observes the packets received from the communication devices 30 and the total of the transfer rates of packets received from the transfer devices 10 (step S5). The detecting unit 71 determines whether the total of the observed transfer rates exceeds the threshold Th4 (step S6). When the total of the transfer rates of the packets transmitted to the control device 60 equals or exceeds the threshold Th4 (step S6: Yes), the detecting unit 71 requests the determining unit 81 to select a flow for which the creation cycle of the reporting packets is able to be lengthened. The determining unit 81 selects a flow that is not transferred through the transfer device 10 whose utilization rate of the buffer 18 exceeds the threshold Th1 (step S7). The determining unit 81 lengthens the creation cycle of the reporting packets and lowers the sample rate for the selected flow (step S8).

When the utilization rate of the buffer 18 in the transfer device 10 of the transmission source is less than the threshold Th1 (step S2: Yes), it is determined that the congestion warning concerning the transfer device 10 of the transmission source is not detected. The detecting unit 71 determines whether the utilization rates of the buffers 18 in other transfer devices 10 are less than the threshold Th1 (step S9). When the utilization rate of the buffers 18 in at least one of the transfer devices 10 in the network is equal to or greater than the threshold Th1 (step S9: No), the detecting unit 71 finishes the processing since congestion warning is detected. Conversely, when the utilization rate of the buffer 18 in any of the other transfer devices 10 in the network is less than the threshold Th1 (step S9: Yes), the congestion warning is eliminated and therefore the detecting unit 71 requests the determining unit 81 to return the creation cycles of the reporting packets to the default value. The determining unit 81 determines whether a flow in which the creation cycle of the reporting packets has been changed exists (step S10). When a flow in which the creation cycle of the reporting packets has been changed exists (step S10: Yes), the determining unit 81 transmits the instruction packets for restoring the creation cycles of the reporting packets to the default value and then finishes the processing (step S11). Conversely, when the determining unit 81 determines that no flow in which the creation cycle of the reporting packets has been changed exists, the determining unit finishes the processing (step S10: No).

Figure 26:
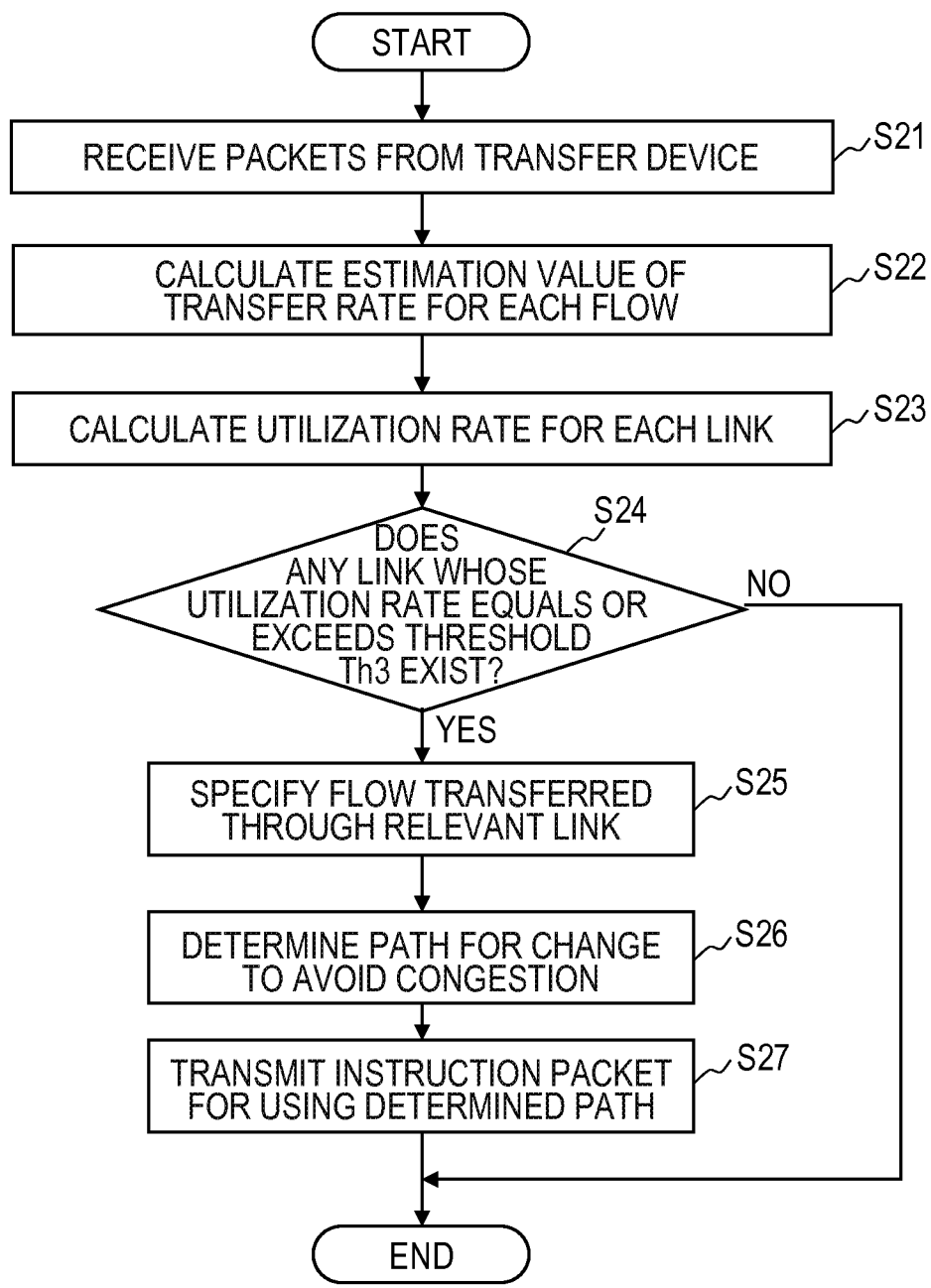
FIG. 26 is a diagram illustrating an example of an operational flowchart for processing that is performed by a control device when a packet is received from a communication device, according to an embodiment.

FIG. 26 is a diagram illustrating an example of an operational flowchart for processing that is performed by a control device when a packet is received from the transfer device, according to an embodiment. The receiving unit 61 outputs a packet received from the communication device 30 to the calculating unit 73 and the specifying unit 72 (step S21). The calculating unit 73 uses the reporting packets to calculate the transfer rates of the flows (step S22). Moreover, the calculating unit 73 uses the calculation results of the transferred flows and the topology information 91 to calculate utilization rates of the links (step S23). The calculating unit 73 determines whether a link having a link utilization rate equal to or greater than the threshold Th3 exists (step S24). When a link in which the link utilization rate exceeds the threshold Th3 exists (step S24: Yes), the selecting unit 82 specifies a flow that is transferred using that link (step S25). The selecting unit 82 determines a path that is to be changed to avoid congestion (step S26). The instruction packet creating unit 83 creates an instruction packet to be transmitted to the transfer device 10 for changing the determined path, and transmits the instruction packet through the transmitting unit 62 to the transfer device 10 (step S27). Conversely, when no link in which the link utilization rate equals or exceeds the threshold Th3 exists (step S24: No), the calculating unit 73 finishes the processing.

In this way, the method according to the first embodiment involves specifying a location where congestion is likely to occur based on a notification from the transfer device 10, and involves shortening a cycle for obtaining a transfer rate of a flow that may be a factor in the congestion at a stage in which a congestion warning occurs. As a result, a time period from the actual occurrence of congestion until the occurrence of congestion or the likelihood that congestion will occur is detected using link utilization rates, may be reduced. Moreover, because processing for avoiding congestion is performed using the actual data used in the detection of the congestion, the time period from the detection of the congestion until processing to change a path for reducing congestion is performed is also shortened. There is a high likelihood that the congestion is reduced beforehand by the control device 60 changing the transfer paths of the flows in the network at a stage immediately prior to a state when congestion occurs.

Moreover, the control device 60 is able to reduce the number of packets processed by the control device 60 by lengthening the cycle for obtaining transfer rates of the flows that are not likely to be affected by the occurrence of the congestion. As a result, the congestion may be detected in a short time after the occurrence of the congestion without increasing the load on the control device 60. Moreover, because the processing load of the control device 60 is adjusted so as not to increase, the processing for obtaining the transfer rates is not likely to hinder the control device 60 from determining transfer paths to be changed. Therefore, the amount of processing of information that is not likely to be used in the detection of the congestion or the avoidance of the congestion is greatly reduced and thus the control device 60 is able to efficiently detect and avoid congestion.

(Second Embodiment)

A modified example of a method for determining a transmission cycle for reporting packets according to a second embodiment will be explained. The processing before the congestion warning is detected, the method for detecting the congestion warning, the method for specifying the flow in which the transmission cycle of the reporting packets is to be shortened, and the method for notifying the transmission timer value that indicates the transmission cycle, are the same as the first embodiment.

Figure 27:
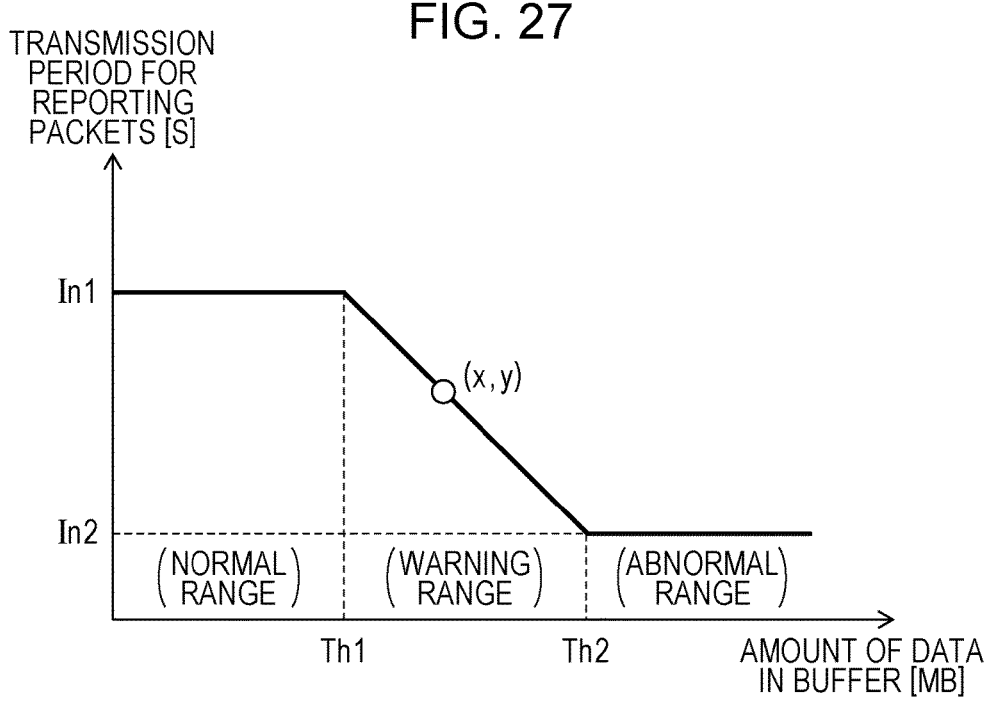
FIG. 27 is a schematic diagram illustrating an example of a method for determining a transmission interval of reporting packets, according to an embodiment.

FIG. 27 is a schematic diagram illustrating an example of a method for determining a transmission interval of reporting packets, according to an embodiment. In the example in FIG. 27, a transmission timer value In1 to be used when the buffer utilization amount is less than the threshold Th1, and a transmission timer value In2 to be used when the buffer utilization amount equals or exceeds the threshold Th2, are determined for each of the transfer devices 10. While the buffer utilization amount stays in between the threshold Th1 and the threshold Th2, the transmission interval of reporting packets is set to decrease as the value indicating the buffer utilization amount increases. At this time, the amount of reduction of the transmission timer value increases in proportion to a value obtained by subtracting the threshold Th1 from the notified buffer utilization amount. Therefore, when the transmission cycle of reporting packets is plotted against the buffer utilization amount, a graph illustrated in FIG. 27 is obtained. When x is the utilization amount of the buffer 18 in the transfer device 10, the transmission timer value y is determined with the following equation.

$$y=(In1-In2)/(Th1-Th2)\times(x-Th2)+In2$$

For example, it is assumed that, for a certain flow, the transmission timer value (In1) when the buffer utilization amount is equal to the threshold Th1 is 30 seconds, and the transmission timer value (In2) when the buffer utilization amount is equal to the threshold Th2 is 2 seconds. Moreover, the threshold Th1 is set at 100 MB and the threshold Th2 is set at 300 MB. When the utilization amount x of the buffer 18 in the transfer device 10 in which a warning is detected is 200 MB, the transmission cycle of reporting packets after the reduction may be calculated from the following formula for that flow.

$$y=(30-2)/(100-300)\times(200-300)+2=16 \text{ (s)}$$

The determining unit 81 is able to use the same calculation for the other flows to determine the transmission timer values after the reduction.

Next, a method for determining a transmission cycle for a flow in which the transmission cycle is to be lengthened will be explained. The transmission cycles are determined by the determining unit 81 so that the number of packets received by the control device 60 per time unit before the congestion warning is detected becomes the same as that after the congestion warning is detected. For example, it is assumed that all the n1+n2 flows are transmitted to the control device 60 at a cycle of y0 before detection of the warning. The n1 flows are flows related to the occurrence of congestion, and thus according to the aforementioned method, the transmission cycles of the reporting packets thereof are changed to y1. Conversely, the transmission cycles of the n2 flows are set at y2 which is a value longer than the current transmission cycle because the n2 flows are slightly related to the occurrence of congestion. In this case, the total number M of reporting packets received per unit of time by the control device 60 is maintained before or after changing the transmission cycles, and is represented by formula (1).

$$M = (1/y0) \times (n1 + n2)$$
$$= \{(1/y1) \times n1\} + \{(1/y2) \times n2\} \quad (1)$$

When the formula (1) is transformed, the transmission timer value y2 for the flow in which the transmission cycle of the reporting packets is lengthened is represented by formula (2).

$$y2 = \{y0 \times y1 \times n2\} / \{y1 \times (n1+n2) - (y0 \times n1)\} \quad (2)$$

For example, the transmission cycle y0 before the detection of the warning is assumed to be 30 seconds for a plurality of flows, and the transmission timer value y1 after the change of the transmission timer for the flow in which the transmission cycle of the reporting packets is reduced is assumed to be 16 seconds. Furthermore, the number of flows in which the transmission cycle of the reporting packets is reduced, n1, is assumed to be 2 flows and the number of flows in which the transmission cycle of the reporting packets is increased, n2, is assumed to be 8 flows. In this case, the transmission timer value for the flow in which the transmission cycle is increased is calculated as indicated below.

$$y = \{30 \times 16 \times 8\} / \{16 \times (2+8) - (30 \times 2)\} = 38.4 \text{ (s)}$$

When the determining unit 81 calculates the transmission timer value as explained in the second embodiment, the frequency for obtaining reporting packets for a flow that is likely to be a factor for congestion may be increased without fluctuating the total amount of packets processed by the control device 60.

(Third Embodiment)

A modified example of a method for determining a transmission cycle for reporting packets according to a third embodiment will be explained. The processing before the congestion warning is detected, the method for detecting the congestion warning, the method for specifying the flow in which the transmission cycle of the reporting packets is to be shortened, and the method for notifying the transmission timer value that indicates the transmission cycle, are the same as the first embodiment. Moreover, the method for determining the transmission timer value for a flow in which the transmission cycle is increased is the same as in the second embodiment.

Figure 28:
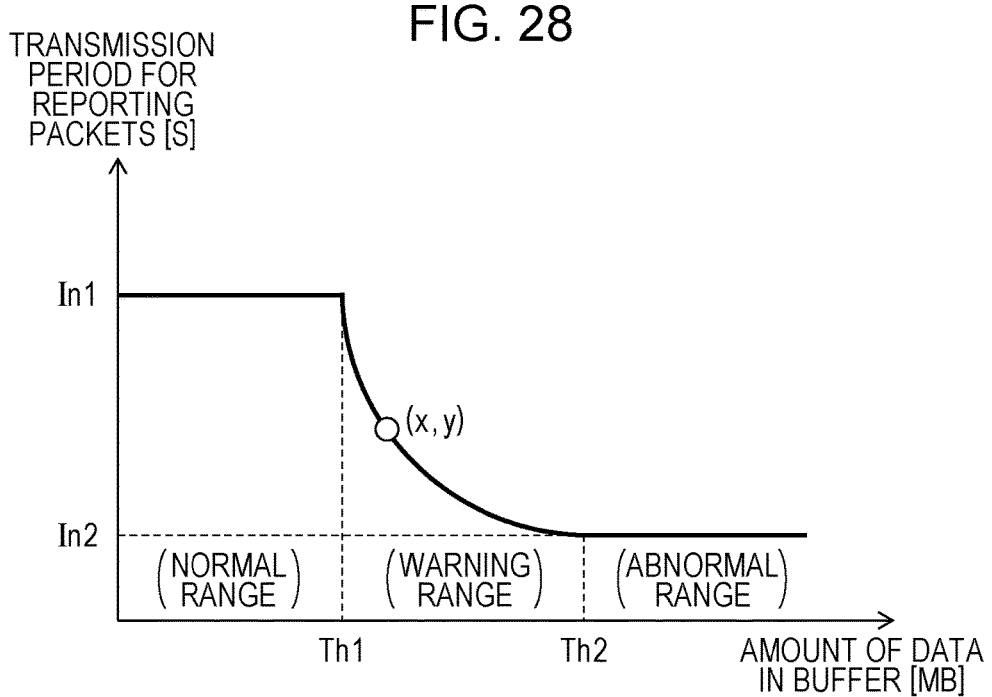
FIG. 28 is a diagram illustrating an example of a method for determining a transmission interval of reporting packets, according to an embodiment.

FIG. 28 is a diagram illustrating an example of an operational flowchart for determining a transmission interval for reporting packets, according to an embodiment. In the example in FIG. 28, a transmission timer value In1 to be used when the buffer utilization amount equals the threshold Th1, and a transmission timer value In2 to be used when the buffer utilization amount equals the threshold Th2, are determined in the transfer devices 10. In the example of FIG. 28, while the buffer utilization amount stays between the threshold Th1 and the threshold Th2, the transmission timer value is reduced as the notified buffer utilization amount increases so that the transmission timer value varies as drawn by a curve of a second order with respect to the buffer amount in the transfer device 10. In the graph illustrated in FIG. 28, when x is the utilization amount of the buffer 18 in the transfer device 10, the transmission timer value y is determined with the following equation.

$$y = (In1 - In2) / (Th1 - Th2)^2 \times (x - Th2)^2 + In2$$

For example, it is assumed that, for a certain flow, the transmission timer value In1 when the buffer utilization amount is equal to the threshold Th1 is 30 seconds, and the transmission timer value In2 when the buffer utilization amount is equal to the threshold Th2 is 2 seconds. Moreover, the threshold Th1 is set at 100 MB and the threshold Th2 is set at 300 MB. When the utilization amount x of the buffer 18 in the transfer device 10 in which a warning is detected is 200 MB, the transmission cycle of the reporting packets after the reduction may be calculated from the following formula for that flow.

$$y = (30-2) / (100-300)^2 \times (200-300)^2 + 2 = 9 \text{ (s)}$$

When the determining unit 81 calculates the transmission timer value as explained in the third embodiment, the transmission cycle of the reporting packets may be set at a smaller value in comparison to when the transmission timer value is calculated using the method described in the second embodiment even if the amount by which the utilization amount of the buffer 18 in the transfer device 10 exceeds the threshold Th1 is small. As a result, the timing for detecting the congestion in the control device 60 may be reduced effectively when using the third embodiment.

(Fourth Embodiment)

The fourth embodiment discusses a method for setting the transmission cycles of reporting packets for flows that are not transferred through the transfer device 10 in which the congestion warning is detected so that the transmission cycle increases more for a flow having a smaller fluctuation of the transfer rate. The processing before the congestion warning is detected, the method for detecting the congestion warning, the method for specifying the flow in which the transmission cycle of the reporting packets is to be shortened, and the method for notifying the transmission timer value that indicates the transmission cycle, are the same as the first embodiment to third embodiments.

The calculating unit 73 groups the flows which are not transferred through the transfer device 10 in which the congestion warning is detected into a plurality of classes using the amount of fluctuation of the transfer rates for the flows. The amount of fluctuation is an amount that represents the ratio of how much the deviation of a certain flow accounts for the average value of that flow. The fluctuation of the transfer rate in a flow of a class having a small amount of transfer rate fluctuation within a certain period of time is expected to be relatively small thereafter. Accordingly, the calculating unit 73 notifies the determining unit 81 about an identifier of a flow in which the transfer rate fluctuation is relatively small among the flows not transferred through the transfer device 10 in which the congestion warning is detected.

The determining unit 81 lengthens the notified transmission cycle (transmission timer value) of the reporting packets and does not change the transmission timer value for a flow in which the fluctuation of the transfer rate is large even if the flow is not transferred through the transfer device 10 in which the congestion warning is detected.

The calculating unit 73 reduces a warning threshold in the transfer device 10 used for transferring a flow in which the transmission cycle is lengthened in order to avoid a delay in the detection in congestion caused by the flow in which the transmission cycle is lengthened. As a result, the detection of the congestion is not delayed even if congestion occurs due to the flow in which the transmission cycle of the reporting packets is lengthened, because the congestion warning may be detected easily in the transfer device 10 that is used for transferring the flow in which the transmission cycle of the reporting packets is lengthened.

The calculating unit 73 may group the amount of fluctuation of the transfer rates of the flows into two or more classes. In this case, the calculating unit 73 uses a threshold Th5 and a threshold Th6 in order to perform grouping in accordance with the amount of fluctuation of the transfer rates. The threshold Th5 is assumed to be smaller than the threshold Th6. The calculating unit 73 notifies the determining unit 81 about the flows in which the amount of fluctuation of the transfer rate is less than the threshold Th5 and about the flows in which the amount of fluctuation of the transfer rate is between the threshold Th5 and the threshold Th6, as flows in which the transmission timer value is to be lengthened. At this time, the calculating unit 73 notifies the determining unit 81 of information on a class into which the notified flow is grouped.

The determining unit 81 changes the transmission timer value and the threshold Th1 in the transfer device 10 through which the flows are transferred in accordance with the grouped classes. The amount of fluctuation of the transmission timer value in a flow in which the fluctuation is smaller than the threshold Th5 is increased to be greater than that of a flow in which the fluctuation is between the threshold Th5 and the threshold Th6.

Figure 29:
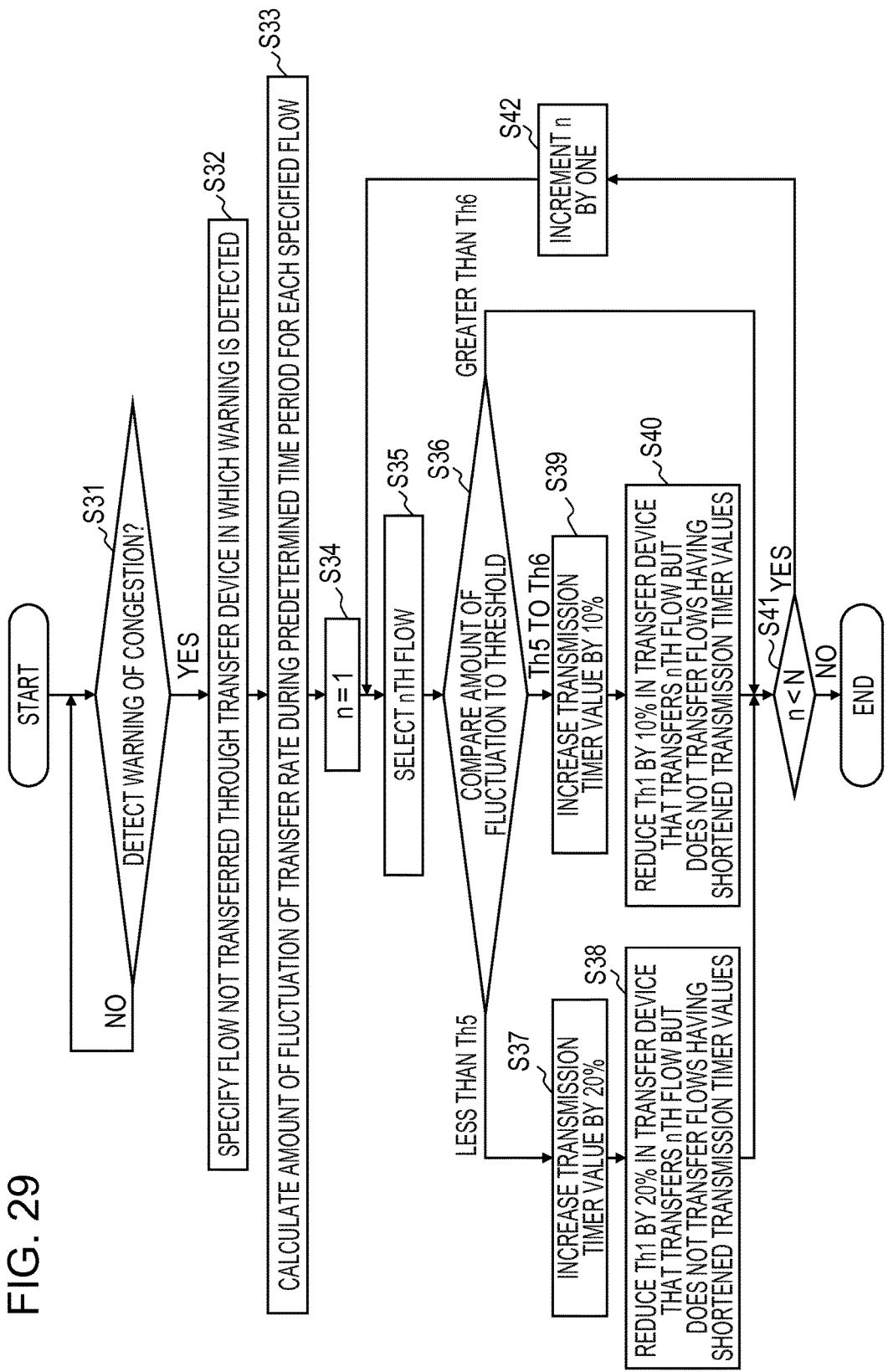
FIG. 29 is a diagram illustrating an example of an operational flowchart for processing that is performed by a control device when a congestion warning is detected, according to an embodiment.

FIG. 29 is a diagram illustrating an example of an operational flowchart for processing that is performed by a control device when a congestion warning is detected, according to an embodiment. FIG. 29 is an example, and the amount of change of the transmission timer value of the flow and the amount of change of the threshold Th1 to be used for detecting the warning in the transfer device 10 may be changed in accordance with the implementation of the system. Moreover, the steps S37 and S38 may be interchanged and the steps S39 and S40 may be interchanged.

The detecting unit 71 waits until a congestion warning is detected (step S31: No). When the detecting unit 71 detects a congestion warning (step S31: Yes), the specifying unit 72 specifies flows that are not transferred through the transfer device in which the warning is detected (step S32). The calculating unit 73 calculates, for each of the specified flows, amount of fluctuation of the transfer rate during a predetermined time period (step S33). The calculating unit 73 sets a variable n at 1 (step S34), and selects the nth flow (step S35). The calculating unit 73 compares the amount of fluctuation of the selected flow to a threshold (step S36). When the amount of fluctuation of the selected flow is less than the threshold Th5, the determining unit 81 determines that the transmission timer value of the selected flow is to be increased by 20%, and transmits a request packet for changing the transmission timer value, to the communication device 30 (step S37). When the amount of fluctuation of the selected flow is less than the threshold Th5, the calculating unit 73 reduces the threshold Th1 by 20% in the transfer device 10 that transfers the nth flow but does not transfer flows for which the transmission timer value is shortened (step S38).

When the amount of fluctuation of the selected flow is between the threshold Th5 and the threshold Th6, the determining unit 81 determines that the transmission timer value of the selected flow is to be increased by 10%, and transmits a request packet for changing the transmission timer value, to the communication device 30 (step S39). When the amount of fluctuation of the selected flow is between the threshold Th5 and the threshold Th6, the calculating unit 73 further reduces the threshold Th1 by 10% in the transfer device 10 that transfers the nth flow but does not transfer flows for which the transmission timer value is shortened (step S40).

Meanwhile, when the amount of fluctuation in the selected flow is greater than the threshold Th6, the calculating unit 73 determines that the transmission timer value of the nth flow is not to be changed (greater than Th6 in step S36).

Thereafter, the calculating unit 73 determines whether the value of n is less than a constant N (step S41). The constant N represents the total number of flows not transferred through the transfer device 10 in which the warning is detected. When the value of n is less than the constant N (step S41 Yes), the calculating unit 73 increments n by 1 (step S42), and returns to step S35. When the value of n is equal to or greater than the constant N, the calculating unit 73 finishes the processing (step S41: No).

In this way, in the fourth embodiment, flows for which the transmission timer value of the reporting packet is increased is limited to a flow whose fluctuation of the transfer rate is relatively low in the transfer device 10 in which the congestion warning is detected. This lowers a risk that the occurrence of congestion would be overlooked due to the occurrence of congestion in a flow for which the transmission interval of the reporting packets is lengthened. Moreover, since the threshold to be used when the calculating unit 73 detects the warning in the flow transfer is reduced, a risk that a congestion warning would be overlooked is lowered.

(Other)

The embodiments are not limited to the above explanations, and various modifications are possible. Some examples of such modifications are described below.

The parameter used for detecting congestion or for determining a possibility that congestion may occur is not limited to the utilization rate of the buffers in the transfer devices 10. That is, any parameter that is able to be used to evaluate the processing load of the transfer device 10 in accordance with the implementation of the system may be used for the detection of congestion or the determination as to whether there is a possibility that congestion may occur.

The formats of the notifying packets illustrated in FIG. 17 are examples and other information elements may be included therein in accordance with the implementation of the system. For example, when a sample rate is included in a notifying packet, the switch (transfer device 10) do not have to calculate the sample rate and thus the processing load on the switch may be reduced.

In order to improve readability in the embodiments discussed herein, the term used for expressing the units of information transmitted and received within the network is merely standardized as "packet". As a result, the term "packet" may be rewritten as "frame" as appropriate according to the implementation thereof.

The information elements in the packets and tables described above are examples and the information elements may be changed in accordance with the implementation thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a processor configured to:
receive load information indicating a magnitude of a processing load, at a predetermined interval, from each of a plurality of transfer devices in a network,
receive, from each of a plurality of communication devices that perform communication through one or more of the plurality of transfer devices, a reporting packet for reporting information on a flow transmitted by the each communication device,
specify, using the reporting packet, a first flow that is transferred through a first transfer device having a processing load greater than a detection threshold used for detecting a congestion warning, as a candidate for a flow whose path is to be changed when congestion occurs,
when the first flow is specified, transmit a first packet for shortening a transmission interval of a first reporting packet including information on the first flow and raise a sample rate of the first flow, and determine a total transfer rate of packets received from the transfer devices,
when the total transfer rate equals or exceeds a predetermined threshold, transmit a second packet for lengthening a transmission interval of a second reporting packet for reporting information on a second flow that is transferred in the network without passing through the first transfer device and lower a sample rate of the second flow; and
a memory coupled to the processor, configured to store information on flows in the network.

2. The apparatus of claim 1, wherein
the processor is further configured to:
calculate a link utilization rate for each of links connecting between the plurality of transfer devices by obtaining transfer rates of flows transmitted and received between the plurality of communication devices, from the first and the second reporting packets;
select, from among the one or more first flows, a second flow whose transfer path is to be changed when the link utilization rate of a link connected to the first transfer device increases to a prediction value indicating a utilization rate when an occurrence of congestion is predicted in the first transfer device;
create an instruction packet for changing a transfer path of the second flow; and
transmit the instruction packet to the first transfer device and to a second transfer device that starts transfer of the second flow in place of the first transfer device.

3. The apparatus of claim 1, wherein
the processor is further configured to
determine a transmission interval of the first reporting packet so that the transmission cycle of the first reporting packet decreases with increase in a difference between a processing load of the first transfer device and the detection threshold, while determining a transmission interval of the second reporting packet so that a number of packets received by the apparatus in a predetermined time period does not fluctuate.

4. The apparatus of claim 3, wherein
the first reporting packet includes a transmission source of the first flow, a transmission destination of the first flow, and an amount of data that are obtained in a transmission interval of the first reporting packet by extracting packets from the first flow at a sampling rate determined for the first flow; and
when a transmission interval of the first reporting packet changes from a first interval to a second interval that is shorter than the first interval, the processor determines a sampling rate to be used for the second interval so that a number of packets extracted in the first interval is equal to a number of packets extracted in the second interval.

5. The apparatus of claims 2, wherein
the processor replaces the detection threshold with a value that is set to decrease with increase in amount of lengthening a transmission interval of the second reporting packet with respect to a transfer device that transfers a flow whose information is notified by the second reporting packet and does not transfer the first flow.

6. A method performed by an apparatus for controlling paths in a network, the method comprising:
receiving load information indicating a magnitude of a processing load, at a predetermined interval, from each of a plurality of transfer devices in the network;
receiving, from each of a plurality of communication devices that perform communication through one or more of the plurality of transfer devices, a reporting packet for reporting information on a flow transmitted by the each communication device;
specifying, using the reporting packet, one or more first flows that are transferred through a first transfer device having a processing load greater than a detection threshold used for detecting a congestion warning, as a candidate for a flow whose path is to be changed when congestion occurs;
when the one or more first flows are specified, requesting the plurality of communication devices to shorten a transmission interval of a first reporting packet including information on the one or more first flows, raising a sample rate of the one or more first flows, and determining a total transfer rate of packets received from the transfer devices; and
when the total transfer rate equals or exceeds a predetermined threshold, requesting the plurality of communication devices to lengthen a transmission interval of a second reporting packet for reporting information on a second flow that is transferred in the network without passing through the first transfer device and lowering a sample rate of the second flow.

7. The method of claim 6, further comprising:
calculating a link utilization rate for each of links connecting between the plurality of transfer devices by obtaining transfer rates of flows transmitted and received between the plurality of communication devices, from the first and the second reporting packets;
selecting, from among the one or more first flows, a second flow whose transfer path is to be changed when the link utilization rate of a link connected to the first transfer device increases to a prediction value indicating a utilization rate when an occurrence of congestion is predicted in the first transfer device;

creating an instruction packet for changing a transfer path of the second flow; and transmitting the instruction packet to the first transfer device and to a second transfer device that starts transfer of the second flow in place of the first transfer device.

* * * * *